(12) United States Patent
Sinmao et al.

(10) Patent No.: US 11,514,411 B2
(45) Date of Patent: Nov. 29, 2022

(54) MULTI-TIER TOKENIZATION PLATFORM

(71) Applicant: Pontoro Inc., Mountain View, CA (US)

(72) Inventors: Monique Vaddhana-Moni Sinmao, Clifton, VA (US); Antonio Vitti, Fremont, CA (US); Ka Hang Simon Sham, Hong Kong (CN); Robert Havelock Dewing, Mountain Lakes, NJ (US)

(73) Assignee: Pontoro Inc., Mountain View, CA (US)

( * ) Notice: Subject to any disclaimer, the term of this patent is extended or adjusted under 35 U.S.C. 154(b) by 127 days.

(21) Appl. No.: 16/598,957

(22) Filed: Oct. 10, 2019

(65) Prior Publication Data

US 2020/0184431 A1 Jun. 11, 2020

Related U.S. Application Data

(60) Provisional application No. 62/743,859, filed on Oct. 10, 2018.

(51) Int. Cl.
*G06Q 20/06* (2012.01)
*G06Q 20/36* (2012.01)
*H04L 9/06* (2006.01)

(52) U.S. Cl.
CPC ..... *G06Q 20/0658* (2013.01); *G06Q 20/3672* (2013.01); *G06Q 20/3678* (2013.01); *H04L 9/0637* (2013.01)

(58) Field of Classification Search
CPC ........... G06Q 20/0658; G06Q 20/3672; G06Q 20/3678; H04L 9/0637; H04L 2209/38; H04L 9/3239
See application file for complete search history.

(56) References Cited

U.S. PATENT DOCUMENTS 10,929,842 B1 * 2/2021 Arvanaghi ............ H04L 67/10
2007/0198421 A1 8/2007 Muller et al.
(Continued)

OTHER PUBLICATIONS

QuantmRE. "Why Asset-Backed Tokens could be a Better Investment than REITS or Rentals," https://launch.quantmre.com/asset-backed-tokens-are-a-better-investment-than-reits-or-rentals/ (Oct. 3, 2018). (Year: 2018).*

(Continued)

*Primary Examiner* — Elizabeth H Rosen
(74) *Attorney, Agent, or Firm* — Bachmann Law Group PC

(57) ABSTRACT

A platform implementing a two-tier tokenization process to build a digital asset pool at a server. An application builds the digital asset pool, initializes general asset tokens to represent pro-rata ownership interests in a general pool of assets, and uses general asset tokens to create specific asset tokens to represent ownership interests in specific assets from that pool that a user of the platform selects, from a remote device in communication with the server, from the general pool. General asset tokens offered to eligible retail and/or institutional investors generate funding to build the asset pool. Owners of general asset tokens are periodically offered, by the server, the option to select portions of specific assets from the general asset pool, and create through the two-tier tokenization process, shares of specific asset tokens, subject to the technical protocols, ownership concentration limits, and bidding and allocation schema established by the present platform.

11 Claims, 13 Drawing Sheets

(56) References Cited

U.S. PATENT DOCUMENTS

| | | |
|---|---|---|
| 2013/0318619 A1 | 11/2013 | Heyner |
| 2015/0081589 A1* | 3/2015 | RovelleQuartz ....... G06Q 40/04 |
| | | 705/36 R |
| 2017/0046689 A1 | 2/2017 | Lohe et al. |
| 2017/0085555 A1 | 3/2017 | Bisikalo et al. |
| 2017/0116671 A1* | 4/2017 | Clark .................... G06Q 40/04 |
| 2018/0247303 A1 | 8/2018 | Raj et al. |
| 2019/0095995 A1* | 3/2019 | Rohlfs ................. G06Q 20/389 |
| 2020/0042908 A1* | 2/2020 | Hurtado ................ G06Q 40/06 |

OTHER PUBLICATIONS

Kauflin, Jeff. "This Startup Could Finally Bring Real Estate into the Blockchain Era," Forbes, https://www.forbes.com/sites/jeffkauflin/2018/04/17/this-startup-could-finally-bring-real-estate-into-the-blockchain-era/?sh=6bac7fe43a4b (Apr. 17, 2018). (Year: 2018).*
Trakx. "Overview of Asset-Backed Tokens," Medium.com, https://medium.com/@Trakx.io/overview-of-asset-backed-tokens-90f1986de233 (Sep. 6, 2018). (Year: 2018).*
Vidal, Maria T. "Tokenizing Real Estate on the Blockchain," Medium.com, https://medium.com/@mariat.vidal/tokenizing-real-estate-on-the-blockchain-9a13ae99bf11 (Jul. 27, 2017). (Year: 2017).*

* cited by examiner

MULTI-TIER TOKENIZATION PLATFORM

CROSS REFERENCE TO RELATED APPLICATIONS

This application claims the priority benefit of U.S. Provisional Application Ser. No. 62/743,859, titled "MULTI-TIER TOKENIZATION PLATFORM," filed Oct. 10, 2018, the disclosures of which are incorporated herein by reference.

BACKGROUND

Investment in large scale assets has been limited to large entities with large financial resources that exist in the same jurisdiction, both by circumstance and technology. For example, large illiquid asset types such as infrastructure project finance loans have historically been limited by several investment issues.

For example, participation in the financing of large-scale infrastructure projects in the U.S. are primarily limited to large specialized financial institutions with a U.S. presence. The access of overseas institutional investors to large infrastructure financing transactions in the U.S. is restricted by visibility, distance, language and lack of local market knowledge. Further, direct participation of investors in large infrastructure projects or through specialized infrastructure funds is constrained due to minimum investment amount requirements which usually exceeds their funding capabilities.

Financing commitments to infrastructure funds or projects tend to be rigid and deal specific with high concentration risks. Limited liquidity is available to investors in the infrastructure sector whether investing directly in a project or through a specialized private equity fund. There is no technical system that addresses the nuances of financing large-scale assets like infrastructure projects. What is needed is a technical solution to the problems associated with financing large-scale projects and other types of illiquid assets.

SUMMARY

Figure 1A:
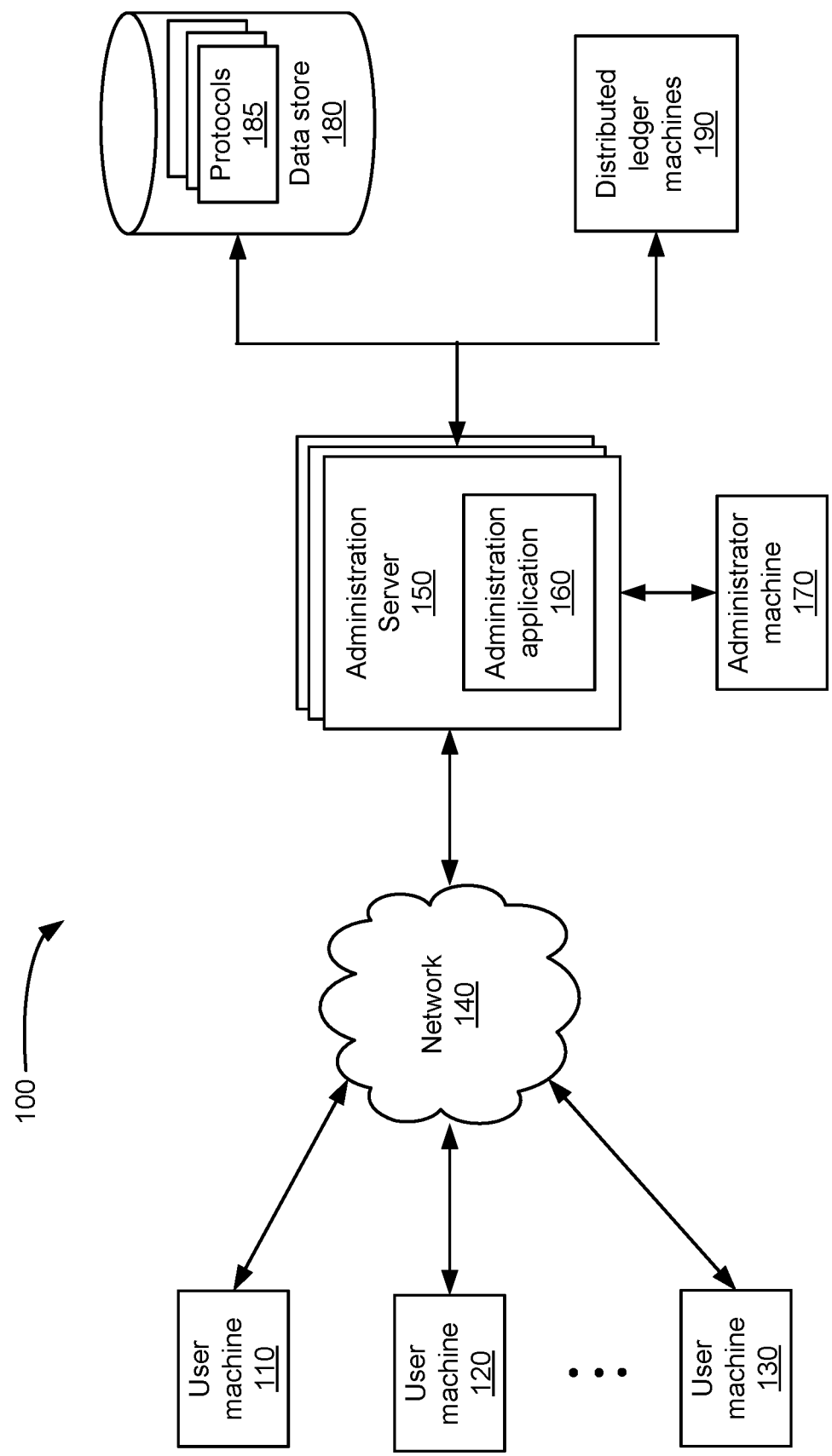
FIG. 1A illustrates a block diagram of a system for providing a two-tier tokenization platform with protocols stored in a remote data store.

The present technology, roughly described, provides a technical solution to the technical problem of providing a platform that addresses large-scale assets and other types of illiquid assets. The platform of the present technology provides an automated two-tier tokenization process that is machine implemented, uses a distributed ledger system, and provides artificial intelligence driven user support services. This technology presents a flexible technical solution to address any large-scale asset in any geographic jurisdiction.

The platform of the present technology implements a two-tier tokenization process to build a digital asset pool over one or more servers or machines An application builds the digital asset pool, called the general asset pool, by creating a digital representation of large-scale financial and physical assets. In some instances, the two-tier tokenization process uses computer protocols called smart contracts to digitally facilitate, validate, and govern the interactions and performance of the contract or contracts associated with each token. These smart contracts may function on one or more blockchains, which may be public or permissioned networks that place restrictions on who is allowed to participate in the network and in what transactions. The use of smart contracts on blockchain enables transactions to occur efficiently, often without third parties, and enables information about the token and its transactions to be trackable and immutable. General asset tokens (GATs), with contractual features defined by smart contracts, represent pro-rata ownership interests in the general asset pool. Specific asset tokens (SATs), with contractual features defined by smart contracts, represent ownership interests in specific assets that a user of the platform selects and removes, from a remote device in communication with the one or more servers or machines, from the general asset pool. General asset tokens offered to eligible retail and/or institutional investors generate funding to build the general asset pool. Owners of general asset tokens are periodically offered, by the server, the option to create specific asset tokens representing a portion of whole assets from the general asset pool, through the two-tier tokenization process, subject to the technical protocols, ownership concentration limits, and bidding and allocation schema established by the present platform.

By using general asset tokens to develop a custom portfolio of specific asset tokens, all of which are created from available assets in the general asset pool and stored in memory by the platform, users of the platform can establish a desired level of exposure and diversification which reflects their risk/return preferences and any of their other investment criteria. Tokenization into general and specific assets powered by smart contracts enables liquidity by making the asset tokens more easily tradeable and in smaller increments, even for traditionally illiquid asset types. Additionally, the present system significantly enhances liquidity through information by using various machine learning and artificial intelligence ("AI") tools to recommend trading ideas and promote transaction activity among users (e.g., investors) on an on-going basis.

In some instances, a method is disclosed for providing a multi-tier tokenization platform. The method includes initializing one or more general asset tokens by an application on a first machine, wherein the one or more general asset tokens associated with a plurality of users of the platform, each of the general asset tokens having a first value, and the one or more general asset tokens mapped, by the application, to a value of one or more assets in a general asset pool. A request is received by the application to use one of the one or more general asset tokens to create one or more specific asset tokens that map to a portion of specific assets from the general asset pool, wherein the one or more assets including the specific assets. The request can be initiated from a remote machine associated with one of the plurality of users associated which the one of the one or more general asset tokens to be used in the creation of specific asset tokens. A first specific asset token is created that maps to a portion of a whole specific asset, wherein the first specific asset token based at least in part on the request data. A record of the generated specific asset token and the updated status of the general asset token is stored.

In some instances, a system for providing a multi-tier tokenization platform includes a server having memory and a plurality of processors. One or more modules are stored on memory and executed by the plurality of processors. The modules are executable to initialize one or more general asset tokens by an application on a first machine, the one or more general asset tokens associated with a plurality of users of the platform, map, by the application, the one or more general asset tokens created by the application to a general asset pool stored in memory, each of the general asset tokens having a first value, receive a request data by the application to use one of the one or more general asset tokens to create one or more specific asset tokens that map to portions of whole specific assets, the request initiated from a remote machine associated with one of the plurality of users associated with one of the one or more general asset tokens to be used for creating one or more specific asset tokens, wherein the one or more assets include the specific assets, create a first specific asset token that maps to a portion of a whole specific asset token, the first specific asset token based at least in part on the request data, and store a record of the removal of the general asset token used to create a specific asset token that removes some associated value from the general asset pool.

DETAILED DESCRIPTION

The present technology, roughly described, provides a technical solution to the technical problem of providing a platform that addresses large-scale assets and other types of illiquid assets. The platform of the present technology provides an automated two-tier tokenization process that is machine implemented, uses a distributed ledger system, and provides artificial intelligence driven user support services. This technology presents a flexible technical solution to address any large-scale asset in any geographic jurisdiction.

The platform of the present technology implements a two-tier tokenization process to build a digital asset pool over one or more servers or machines An application builds the digital asset pool, called the general asset pool, by creating a digital representation of large-scale financial and physical assets. The two-tier tokenization process uses computer protocols called smart contracts to digitally facilitate, validate, and govern the interactions and performance of the contract or contracts associated with each token. These smart contracts may function on one or more blockchains, which may be public or permissioned networks that place restrictions on who is allowed to participate in the network and in what transactions. The use of smart contracts on blockchain enables transactions to occur efficiently, often without third parties, and enables information about the token and its transactions to be trackable and immutable. General asset tokens (GATs), with contractual features defined by smart contracts, represent pro-rata ownership interests in the general asset pool. Specific asset tokens (SATs), with contractual features defined by smart contracts, represent ownership interests in specific assets that a user of the platform selects and removes, for example by providing input through a remote device in communication with the one or more servers or machines (collectively referred to as server in some portions herein), from the general asset pool. General asset tokens offered to eligible retail and/or institutional investors generate funding to build the general asset pool. Owners of general asset tokens are periodically offered, by the server, the option to create specific asset tokens representing fractional shares of assets from the general asset pool, through the two-tier tokenization process, subject to the technical protocols, ownership concentration limits, and bidding and allocation schema established by the present platform.

By using general asset tokens to develop a custom portfolio of specific asset tokens, all of which are created from available assets in the general asset pool and stored in memory by the platform, users of the platform can establish a desired level of exposure and diversification which reflects their risk/return preferences and any of their other investment criteria. Tokenization into general and specific assets powered by smart contracts enables liquidity by making the asset tokens more easily tradeable and in smaller increments, even for traditionally illiquid asset types. Additionally, the present system significantly enhances liquidity through information by using various machine learning and artificial intelligence 'AI' tools to recommend trading ideas and promote transaction activity among users (e.g., investors) on an on-going basis.

The machine-based platform of the present technology has several benefits and provides technical solutions to several technical problems.

One technical problem is the lack of a technical platform for allowing entities with more modest financial resources to directly participate in the financing of large financial or physical assets. There is no platform or technical solution that allows for smaller scale participation in the financing of large assets.

The present technology solves this technical problem by providing a platform that allows for digitization of assets using a two-tiered cascading tokenization system. By digitizing tokens into two tiers by an application on a server, the second tier providing a fractional ownership of an asset as a digital token that can be stored and accessed, users who don't have access to large financial or physical assets can reasonably and easily participate in the platform to invest in financing of large assets.

Another technical problem with the financing of large financial or physical assets is that the assets are not associated with technology that enables diversification through traditional platforms. Rather, an investor wishing to invest in financing of a large asset is limited to a single large investment through traditional banking technology.

The present platform solves this technological problem by providing, through a server that implements the platform, a computerized protocol and logic that allows selective creation of digital specific asset tokens using digital general asset tokens, wherein the selection allows platform users to customize their portfolio created and held through the platform. The users, by engaging the platform functionality, can achieve desired levels of return and diversification profiles in large scale assets, a feature that is not possible with prior technology. Hence, the present platform provides technical features that have not been available previously.

Additional features and benefits of the present platform include but are not limited to employing a bidding and allocation schema that democratizes bidding on asset exposures, which also allows price discovery at intermediate intervals over the life cycle of ownership, fractional asset ownership in the form of tokens that are more readily exchangeable into cash or other assets and provide liquidity when desired. The present system provides a platform that is a scalable, self-directed multi-party collaboration system using smart contracts to enhance speed and create trust with immutable transaction records. All domestic and overseas parties can participate in the financing of any financial or physical assets in a local or remote jurisdiction through the use of digital tokens on the present platform. Technology-enabled compliance and enforcement features on the platform and embedded in the tokens ensure that all participants and activities meet regulatory requirements in active jurisdictions on an on-going basis. Additionally, machine learning and artificial intelligence mechanisms (collectively referred to as "AI") enable participants to economically create portfolios that match their strategy, risk, return, and other preferences, and promote liquidity in the asset tokens through continuous portfolio recommendations, thereby encouraging trading of tokens among users.

In some instances, general asset tokens are mapped, by an application, to the general asset pool. A specific asset token maps to a portion of specific assets of the assets in the general asset pool. A whole specific asset is associated with a real/financial asset. References to a "whole specific asset" can refer a portion of the full debt on the real/financial asset, but the whole specific asset is 100% (e.g., "whole") of the present system's inventory of the debt.

FIG. 1A illustrates a block diagram of a system for providing a two-tier tokenization platform with protocols stored in a remote data store. System 100 of FIG. 1A includes user machines 110, 120, and 130, network 140, server 150, administrator machine 170, data store 180, and distributed ledger machines 190. User machines 110-130 may each be associated with the user of the two-tiered tokenization platform provided by server 150. In some instances, the users may be investors in assets for which tokens are provided by server 150. A user may interact with content pages, such as for example webpages provided through a network browser, provided by server 150, mobile applications, and other mechanisms implemented on a user machine, server 150, or distributed over a user machine and server 150.

Network 140 may route traffic between user machines 110-130 and server 150. Network 140 may also route a portion of the traffic, in some instances, between server 150, machine 170, data store 180, and distributed ledger machines 190. Network 140 may be implemented as one or more private networks, public networks, the Internet, an intranet, a local area network, a wide area network, a cellular network, a plain old telephone service network, a wireless network, a Wi-Fi network, wired networks, peer-to-peer networks, or some other network suitable for communicating data between machines.

Administration server 150 may include one or more servers that provide functionality discussed herein. In some instances, the administration servers may include multiple servers over which an administration application 160 is distributed. The administration servers 150 may include one or more network servers that serve as an interface to network 140, may handle network requests and responses, and communicate with one or more administration servers 150.

Administration application 160 may include one or more modules, objects, and/or programs stored on the memory of server 150 (which may be implemented by one or more physical or logical machines or servers) and executed by server processors to perform the functionality described herein. Administration application 160 is described in more detail with respect to FIG. 2.

Administrator machine 170 may be associated with an administration account that may administer aspects of the two-tiered tokenization platform implemented by administration server 150.

Data store 180 may include one or more protocols 185. Protocols 185 may include logic, rules, modules, objects, and/or programs that may implement portions of the functionality described herein. Payment of FIG. 1A, protocols 185 may be implemented all or in part remotely from administration server 150.

Distributed ledger machines 190 may be used to store and/or log data, information, updates, changes, and other information regarding providing a two-tiered tokenization platform by administration server 150. In some instances, the distributed ledger machines may implement a ledger implemented across a network of peers in a network, wherein each peer holds a copy of the complete ledger (e.g., a blockchain implemented distributed ledger).

Figure 1B:
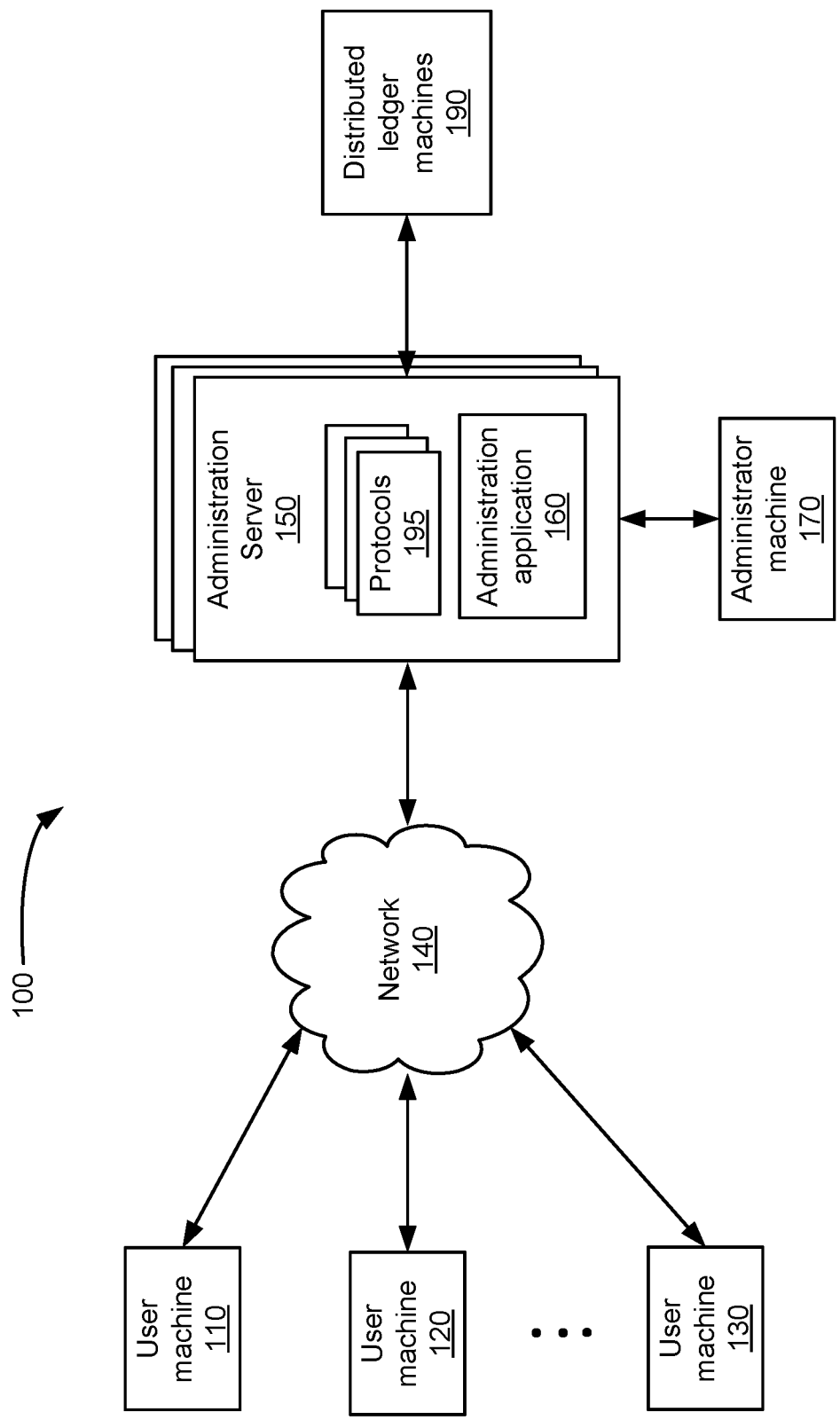
FIG. 1B illustrates a block diagram of a system for providing a two-tier tokenization platform with protocols stored in a local server.

FIG. 1B illustrates a block diagram of a system for providing a two-tier tokenization platform with protocols stored in a local server. System 100 of FIG. 1A includes user machines 110, 120, and 130, network 140, server 150, administrator machine 170, data store 180, and distributed ledger machines 190. The system of FIG. 1B is similar to that of FIG. 1A except that protocols 185 may be implemented entirely local to server 150.

Figure 2:
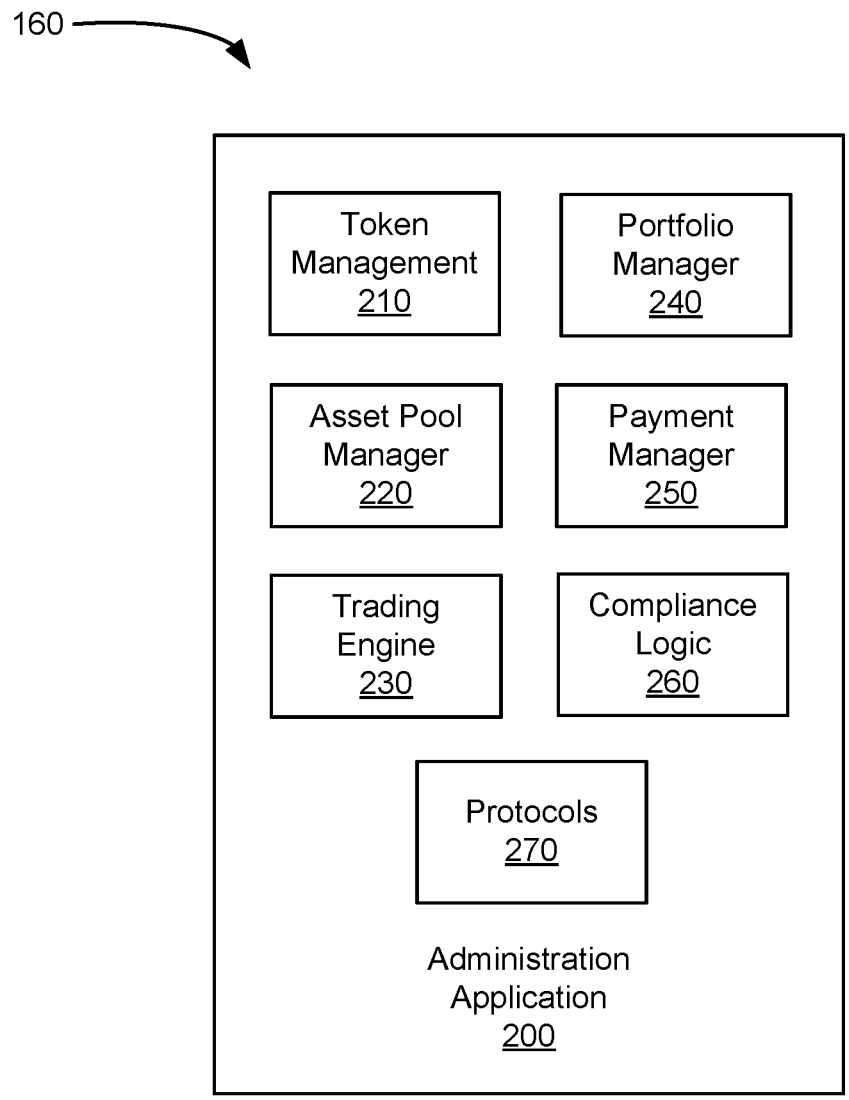
FIG. 2 illustrates a block diagram of an application for providing a two-tier tokenization platform.

FIG. 2 illustrates a block diagram of an application for providing a two-tier tokenization platform. The application 200 of FIG. 2 provides more detail for administration application 160 of the system of FIGS. 1A and 1B. Application 200 includes token management 210, asset pool manager 220, trading engine 230, portfolio manager 240, payment manager 250, compliance logic 260, and protocols 270.

Token management 210 manages general asset tokens and specific asset tokens as part of the two-tiered tokenization system of the present technology. In particular, token management 210 may assign values and ownership to general asset tokens and specific asset tokens, manage general asset tokens used to create specific asset tokens, moving general asset tokens to a repository once they have been used to create specific asset tokens, and other aspects of token management.

Asset pool manager 220 may manage the general asset pool containing a digital representation of financial and real assets. In some instances, asset pool manager 220 may update a pool status, register and manage attribution of ownership and beneficial interest by general asset token users and specific asset token users within the subscription events, move general asset tokens to a repository, and add general asset tokens from the repository back to the asset pool upon triggering events.

Trading engine 230 may handle transfers specific asset tokens between users of the present system. In some instances, trading engine 230 may manage a sale of a specific asset token, an offer to purchase a specific asset token, and trading of specific asset tokens between users of the present system.

Portfolio manager 240 may track a portfolio for users of the system. In some instances, portfolio manager 240 may track general asset tokens and specific asset tokens in a user's profile, values associated with a user's tokens, and may assist a user in selecting specific asset tokens that satisfy user objectives and criteria.

Payment manager 250 may process payments between users and between a user and the platform. In some instances, payment manager 250 may handle fees paid to the platform by a user for performing tasks and operations, premiums paid by a user to other users, and other payments handled by the present system. In the case of assets that pay principal and interest, the payment manager may periodically calculate, transact, and record transmission of principal and interest to a general asset token user or a specific asset token user holding beneficial interest in such payments.

Compliance logic 260 may include logic to ensure that the present system operates in compliance with regulatory, legal, and tax constraints within the necessary jurisdictions. Protocols 270 include logic, rules, modules, objects, and/or programs that may implement portions of the functionality described herein. Protocols 270 is discussed in more detail in respect to FIG. 3.

Figure 3:
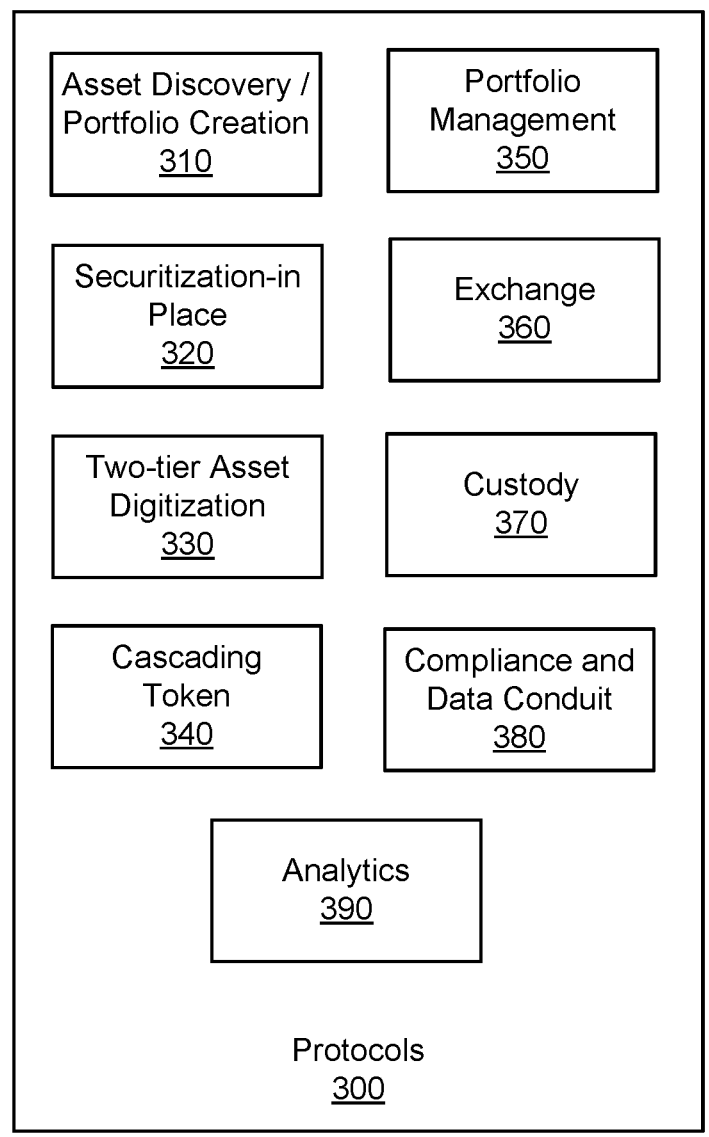
FIG. 3 illustrates a block diagram of a protocols module.

FIG. 3 illustrates a block diagram of a protocol module. Protocols module 300 of FIG. 3 provides more detail for protocols 185 and 195 of FIGS. 1A and 1B, and protocols 270 of FIG. 2. Protocols 300 includes asset discovery and portfolio creation 310, securitization in place 320, two-tier asset digitization 330, cascading token 340, portfolio management 350, exchange 360, custody 370, compliance and data conduit 380, and analytics 390.

Asset discovery and portfolio creation (AD/PC) 310 creates general asset tokens and operates to ultimately raise funds for onboarding asset purchases and onboard new assets. The AD/PC protocol defines attributes of assets in order to create digital representations of the assets (e.g., generate asset tokens), embeds rules and discharges general asset token tasks from the general asset pool, sets completion rules, sets participation window timetables, sets general asset token status, and otherwise governs general asset tokens.

Securitization in place (SIP) 320 includes a securitized token creation protocol. SIP protocol creates specific asset tokens on an as-requested basis that represent fractional share of specific assets from the general pool. The SIP protocol also provides for removing specific asset tokens from the platform ecosystem when the token reaches terminal value or otherwise meets removal conditions.

Two-tier asset digitization 330 provide a two-tier blockchain framework for users to interact with digital assets. Cascading token 340 contains rules for users and asset generators to interact with each other, both at regular intervals and on a rolling basis. Portfolio management 350 is a suite of protocols for users to manage self-directed investments. Exchange 360 contains rules for users to interact with each other and the platform, both at regular intervals and on a rolling basis.

Custody 370 includes a suite of protocols for holding, permissioning, registering, recording ownership and transactions, and governing handling of client cash and tokenized securities, including hot and cold storage of newly created tokens for safeguarding, deposits of existing cash and tokens, and transfers related to purchases, sales, and settlements.

Compliance and data conduit 380 includes logic to actively assure compliance with regulatory matters and internal controls by recording events and event data on the network, extracting data for governance, and enforcing governance and execution schema (e.g., bidding and allocation schema). Importantly, 380 is a data conduit for requesting and exchanging data from on-chain (e.g. a distributed ledger system) and off-chain (e.g., a server or local data store) sources.

Analytics 390 is suite of portfolio tools including portfolio monitoring, risk assessment, and scenario analysis, using AI and machine learning concepts to utilize external data and data extractions to produce recommendations according to user-defined investment objectives.

In some instances, at least some portion of the protocols 300 may be used to implement modules 210-260 of application 200. In some instances, the protocols may be implemented by the modules 210-260 of application 200 in FIG. 2. The protocols of protocol module 300 are discussed in more detail below.

Figure 4:
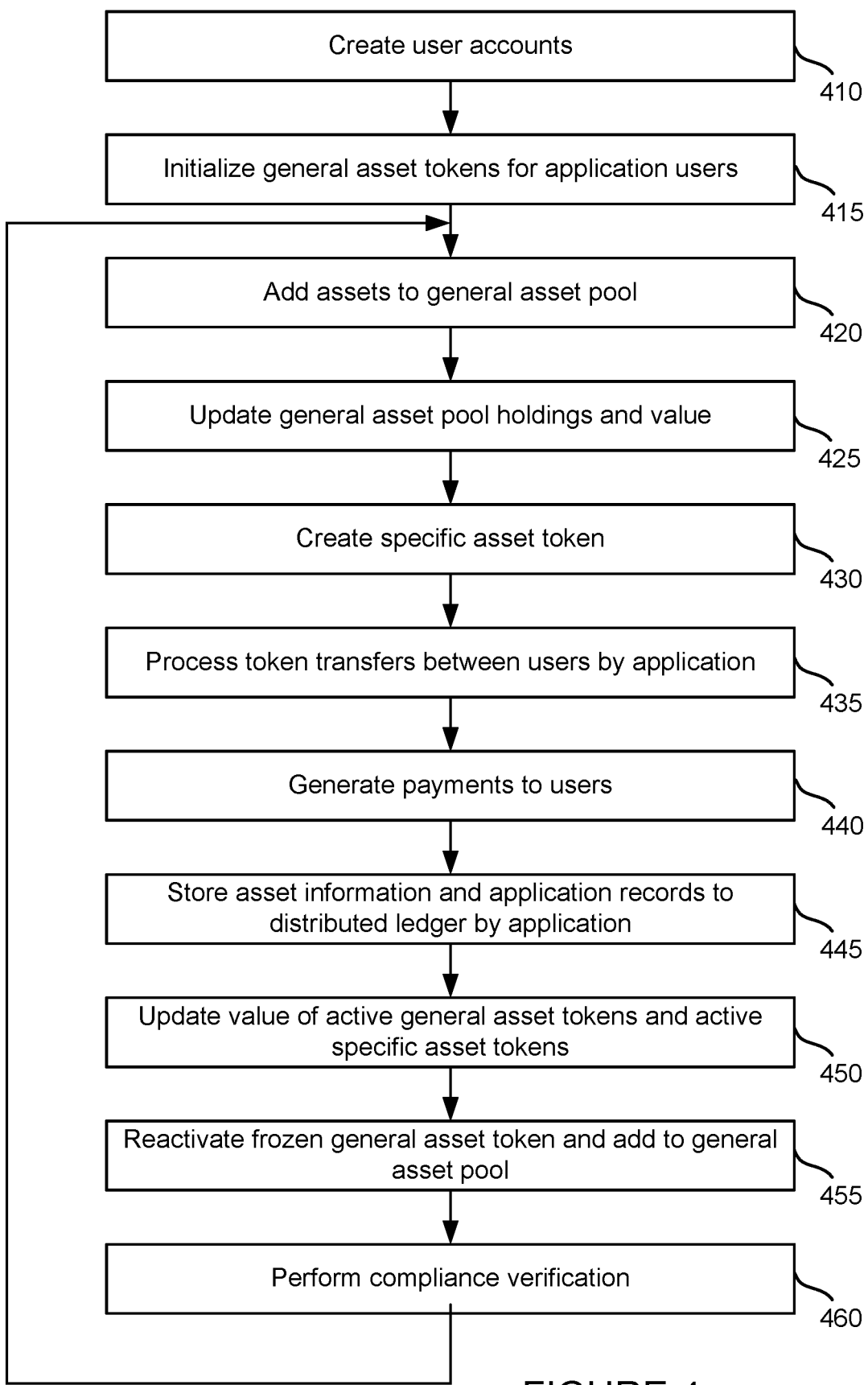
FIG. 4 illustrates a method for providing a two-tier tokenization platform.

FIG. 4 illustrates a method for providing a two-tier tokenization platform. User accounts may be added to the two-tier tokenization platform at step 410. In some instances, a user may eventually be associated with both general asset tokens and specific asset tokens. A user account may include user credentials, user investment objective data, contact data, and other data for the user.

General asset tokens may be initialized for the application users at step 415. In some instances, users may pay a fee to obtain ownership of the general asset tokens. As such, each general asset token is associated with a value. After initializing, the application adds assets to the general asset pool by creating a digital version of the financial or physical asset at step 420. The holdings and value of the general asset pool so created is updated at step 425, and users of general asset tokens register ownership and beneficial interest in some portion of the general asset pool. The holdings of the general asset pool can include assets acquired by the system administrator using the proceeds from the initial issuance of general asset tokens, as well as subsequent sales of general asset tokens. Each general asset token holder has pro-rata rights to the value of the general asset pool, which is backed by the value of the acquired assets that are subsequently represented in digital format.

Generation of general asset tokens can proceed according to an Asset Discovery/Portfolio Creation (AD/PC) protocol. The AD/PC protocol creates general asset tokens by raising funds for onboarding asset purchases, onboarding new assets, create a homogeneous digital asset to represent each asset, embedding rules and discharging general asset token tasks, setting completion rules, setting casting event timetables, setting general asset token status, and otherwise governing general asset tokens. AD/PC protocols are tasks and data interactions between Asset Generator and Investor. AD/PC protocols runs alongside the cascading token protocol, another set of rules between Asset Generator and a user, that is activated by a switch mechanism from the AD/PC protocol and returns results to AD/PC that controls the status of the general asset token.

The AD/PC protocol is foundational to onboarding each unique asset to the present framework ecosystem. Before each unique asset is defined electronically as a homogeneous digital asset type, the AD/PC protocol translates the legal rights and obligations into elements that can be embedded into smart contracts. Collectively, the pool of homogeneous digital assets belongs to a general pool, whose economic value backs the creation of an inventory of general asset tokens with pro rata share to the underlying assets. The homogeneous asset type could be a financial asset, physical asset, or a pool of assets, and each equivalent unit will carry identical rights and obligations. The AD/PC protocol contract definition starts by assigning the full initial value of the asset's contractual rights and obligations to the owners of the general pool. The AD/PC protocol also registers the offering of general asset tokens to comply with regulations for a particular asset type and jurisdiction. The registration allows the present framework to offer general asset tokens to raise pooled funds in fiat currency from a large group of investors for asset purchases. Later, at periodic intervals, called casting events, investors holding general asset tokens may use the general asset tokens to initiate a subscription request, to create specific asset tokens and build a custom portfolio of specific asset tokens. The customized combinations are self-directed, with available AI-guided recommendation tools created by the present framework in the AI Protocol described later.

General asset tokens are evergreen, or in perpetual existence. However, general asset tokens may be active or "frozen" in a repository. The repository stores the general asset tokens whenever owners surrender all or increments of the general asset tokens to perform tasks on the present system. The repository functions as a wallet for the custody of frozen general asset tokens. General asset tokens entering the wallet are marked as frozen. Subsequently, general asset tokens in the repository may be reactivated, via an offering to raise additional funds for another round of asset purchases.

General asset tokens are active once sold to a user and will receive pro-rata share of rewards (primarily, but not exclusively, principal and interest). The present framework will collect general asset tokens as payment for establishing the specific asset token portfolios and store the collected general asset tokens in a repository. General asset tokens may be partially or fully spent. Once a general asset token holder uses his general asset token to create a custom portfolio, the holder now owns newly created specific asset tokens, and the underlying contract will not permit the holder to reverse the specific asset tokens back into original general asset tokens that he previously owned. General asset tokens in repository may be auctioned at a later date to raise additional funds for additional asset purchases. Once auctioned at a later date, general asset tokens are reactivated from the repository.

In effect, the AD/PC protocol enables any eligible user (e.g., investor) to engage in diverse assets and significantly amplifies the quality of their buying power through the pooling of their funds. In doing so, the AD/PC protocol compresses the manpower required, offers more control and more choices to investors, and allows multiple tasks to occur more efficiently at the same time.

While investors in the analog world can also pool resources for buying power, the AD/PC protocol democratizes access to investible assets, particularly to obscure asset classes that are not publicized or easy to find and often require privileged access. Moreover, traditional investment funds do not offer pooled investors the ability to customize asset combinations due to control, investor relationship considerations and cost/administrative complexity. The AD/PC protocol, using blockchain technology including a distributed ledger on multiple machines, enables each investor to create customized investment portfolios from available assets, in contrast to the one-size-fits-all approach by traditional asset managers.

Additionally, general asset token information management is more dynamic, efficient, and rich. Each general asset token "Smart Contract" will contain information on approval to spend the token, including when it is eligible to be used to establish a custom portfolio, the pro rata increment, the pool of assets which may be selected, the transfer of the general asset token back to a repository in exchange for creating specific asset tokens, and a freeze/reactivation switch controlled by the present framework.

Notably, general asset token rights and obligations include rights to a platform rewards program. General asset token values are backed by the value of the user network, including unclaimed assets. The network receives revenues from activities and unclaimed assets. General asset token holders may also receive rewards for performing activities and being a member of the user network, according to platform network rules.

The AD/PC protocol executes several functions, and is perpetual and led by the status of the general asset tokens. The functions include permissioned blockchain interaction and validation protocols, creation of smart contracts containing rights and obligations underlying general asset tokens, issuance and sale of general asset tokens, and fiat to general asset token funding mechanisms. The AD/PC protocol can also determine when raise amounts has been satisfied, determine when asset purchases have been satisfied, and set timetables for casting events. The AD/PC protocol includes a rewards protocol (e.g., principal and interest) for payments, governed by smart contracts on blockchain, a general asset token ownership registration and custody on permissioned blockchain, blockchain-enabled dynamic record of general asset token status, blockchain-enabled management of general asset token addition and removal from the repository on the permissioned blockchain, and a protocol for interacting with cascading token protocol. The AD/PC protocol may further manage users' (i.e., investors') KYC/AML, IDs, and external accounts, sell new general asset tokens or auction existing general asset tokens in future rounds, funded with fiat currency, use general asset token to create specific asset tokens, according to conditions, and actively record ownership of general asset token holders.

Returning to the method of FIG. 4, specific asset tokens can be created at step 430. General asset tokens can be used to create specific asset tokens that represent a portion of a whole specific asset. The creation of specific asset tokens from general asset tokens can include receiving subscription requests from one or more users owning general asset tokens during casting events, receiving premiums from users who receive the specific asset token, generating allocations, and "freezing" a general asset token by removing the general asset token from the general asset pool and placing the general asset token in a repository.

Holders of general asset tokens will periodically be offered the option by the system to use the token to establish or adjust exposures within their custom portfolio during timetables called casting events. At each casting event, general asset token holders can opt to use their general asset tokens to establish a portfolio of specific asset tokens, by submitting a subscription request that defines an ownership stake in available assets in the general pool that are not yet claimed by other general asset token holders. Specific asset tokens represent an ownership share in each unique asset they want to participate in (similar to a bond CUSIP). The subscription request can cover all or a portion of a user's general asset token ownership stake. At each casting event, the available assets in the general pool will be different over time, as it is updated to consist of newly added assets and general pool assets left after the preceding casting event.

Since subscription requests re-allocate ownership interests across the pool of investors, participants seeking to increase their stake in specific assets can, in some instances, offer a premium to other general asset token owners by contributing a portion of the value of their general asset tokens to the value of the general pool. Allocations are then made based upon a democratic bidding and allocation schema, which is applied to bids received within the announced participation window begin and end dates/times. The bidding and allocation schema provides rules for allocation, based on a Dutch auction process, that prioritizes allocations according to highest bid and settles according to lowest clearing price. The bidding and allocation schema can be modified over time according to the system's governance rules.

The sum of the value of newly created specific asset tokens (defined by the subscription request) and the bid premium can equal the holder's initial stake in general asset tokens. For example, an underlying Asset X may be worth $200 dollars. At issuance, ten users of the system can have a pro-rata $20 stake each in Asset X via the general pool underlying their general asset tokens. If a 25% ownership limit is applied, four users may bid to create $50 each of Asset X specific asset tokens. Then, Asset X has been fully subscribed and no further specific asset token X can be created for Asset X. In the future, another user seeking to buy specific asset token X can do so by using fiat currency or negotiating an exchange of other system specific asset token(s) for specific asset token X, but only if one of the current specific asset token X holders wishes to sell his ownership interests in specific asset token X.

In order for the four users to increase their concentration in Asset X, they would have to reduce their stake in other assets down from their pro-rata exposures at issuance of general asset tokens. The four users are only able to induce other users in the pool to both reduce (or in this example fully exit) Asset X exposures and accept higher concentrations in other remaining asset exposures by offering a bid premium. The bid premium improves but does not assure a user's (i.e., investor's) subscription request is accepted; allocations are made based upon the bidding and allocation schema.

As noted above, the system platform enables full or partial securitization of Asset X. Even if only one user subscribes to Asset X, one asset token X worth $50 (or less) can be created for Asset X, leaving $150 worth (or 75%) of Asset X unclaimed. The value will remain in the general asset pool and the ownership stakes will be reallocated to remaining general asset tokens. The unclaimed 75% of Asset X will be made available for users (i.e., investors) to claim at future casting event(s) until it is fully subscribed. In other words, different from traditional securitizations, the entire Asset X value does not need to be subscribed, in order for users to begin to create specific asset token X.

A single general asset token holder can create and own specific asset tokens only up to the limit defined by the system governance rules and applied in the bidding and allocation schema. It is not possible for users (i,e., investors) in aggregate to create more specific asset tokens than the underlying value of asset. In the event that the total requests received from different, general asset token holders to create a specific asset tokens exceeds the value of the underlying asset, the specific asset token is "oversubscribed." When this occurs, creation of the specific asset tokens will be allocated according to the bidding and allocation schema until the full ownership of the underlying asset is allocated. Any unfulfilled subscription stake in that asset will be left as an equivalent amount of unused general asset token(s).

Once a general asset token holder uses their general asset token to create a customized portfolio, the holder now owns newly created specific asset tokens, and cannot reverse the specific asset tokens back into original general asset tokens that they previously owned. System will freeze the amount of general asset tokens used as payment for creating specific asset tokens (and the associated premium bids) and store the retired general asset tokens in a repository. The system repository stores the general asset tokens whenever users (i.e., investors) surrender all or increments of the general asset tokens to perform tasks on the system. The repository functions as a wallet for the custody of frozen general asset tokens: general asset tokens entering the wallet are marked as frozen. Subsequently, general asset tokens in the repository may be reactivated, in order to conduct a further offering to raise additional funds for another round of asset purchases.

The platform will keep track of total general asset tokens held (active) and total general asset tokens used (frozen) to create specific asset tokens, as well as the value of active general asset tokens and active specific asset tokens. Active general asset tokens and active specific asset tokens shall have a fundamental value based on the remaining value of the underlying asset, as well as a market price that is established by trading activity and may be at a premium or discount to the fundamental value. The fundamental value of general asset tokens actively held shall be backed by the value of unclaimed assets in the general pool, net of amortization, at a given time. The fundamental value of active specific asset tokens shall be backed by the value of claimed assets removed from the general asset pool, created according to bidding and allocation schema established for Casting events, and net of amortization, at a given time. For any particular asset, its total fundamental value shall equal the total value of active specific asset tokens for that particular asset plus the equivalent value of that particular asset that remains in the unclaimed general pool represented by general asset tokens. The platform will track this combined value so that each asset is not over- or under-represented when active specific asset tokens and equivalent amount of active general asset tokens for a single asset are counted.

For example, in the commercial use case for U.S. infrastructure projects, the system's initial, but not exclusive, market focus, the value underlying the general asset tokens and specific asset tokens will change over time due to amortization of the underlying assets. Since, in this example, general asset tokens and specific asset tokens are tied to infrastructure project finance loans—whether in the general pool or specific assets—at or prior to loan maturity, the loans may be refinanced or they may reach their terms. Specific asset tokens would get burned when the underlying loan is fully repaid. Likewise, the remaining attribution to the asset will be reduced to zero in the general asset token.

Figure 5:
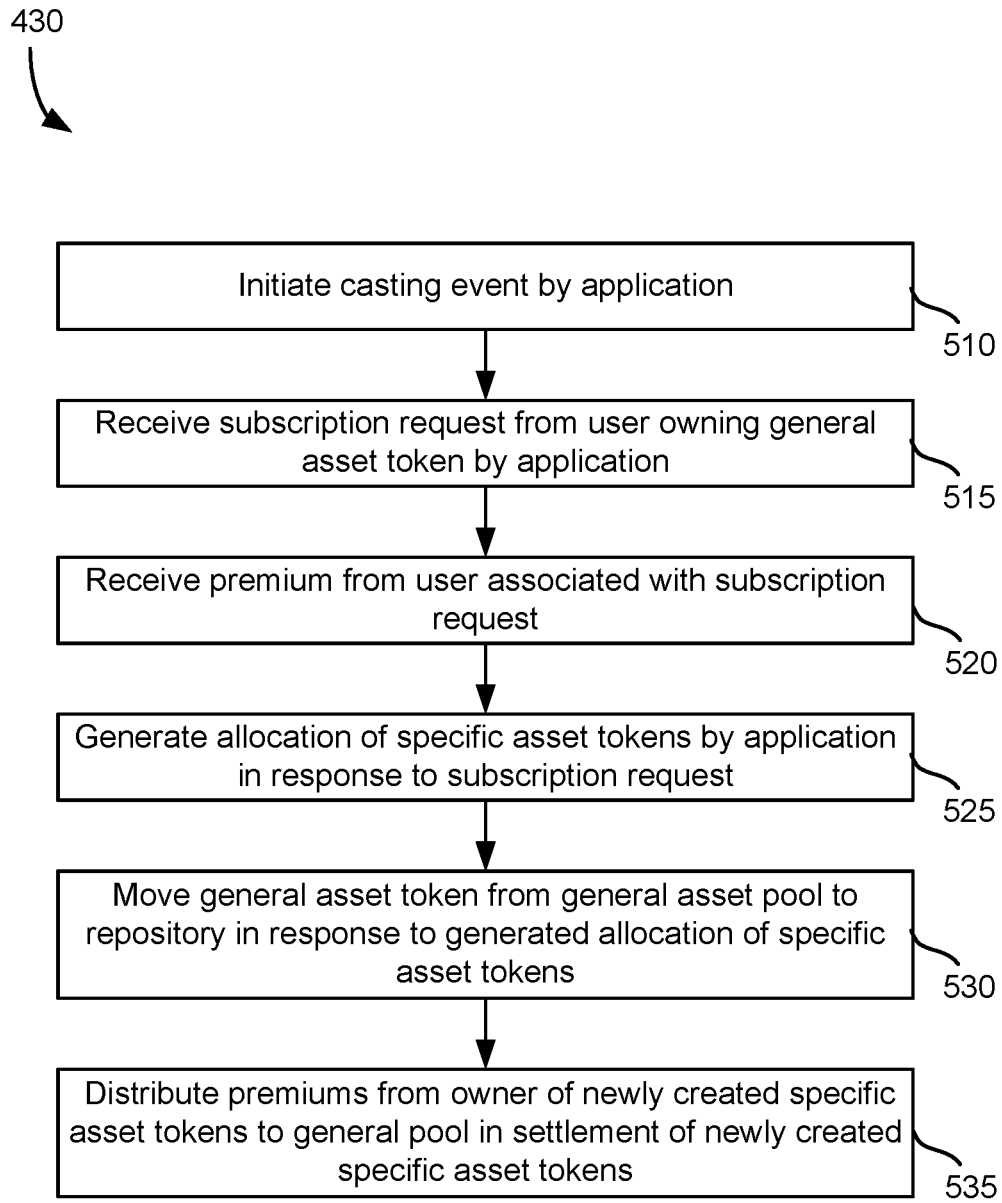
FIG. 5 illustrates a method for creating a specific asset token.

Creating a specific asset token is discussed in more detail with respect to the method of FIG. 5.

Token transfers between users may be processed by an application at step 435. Transfers of specific asset tokens may include a member initiated token sale, member initiated token purchase, or member initiated token trade. More details for processing token transfers is discussed with respect to the method of FIG. 7.

Payments for the users are generated at step 440. In some instances, once the loan assets have been acquired by platform administrators, the holders of the general asset tokens and specific asset tokens will receive cash flows from the assets called rewards. Specific asset token holders will receive cash flow (loan principal and interest payments less network fees) from the specified underlying assets that are represented by the specific asset tokens which they are holding. Likewise, general asset token holders will receive cash flow (loan principal and interest payments, for example, less any fees that may be charged to a user) from the pro-rata share of assets in the general pool of unclaimed assets. Additionally, following casting events, general asset token holders and specific asset token holders may receive rewards in the form additional ownership stakes to reflect bid premiums paid by successful subscription requests. Payments may be dispersed by the system periodically, such as for example monthly, quarterly, annually, in an ad-hoc manner, or some other period.

In some instances, to provide financial services and transmit and receive payments to users and counterparties for providing such services, the present system will conduct KYC/AML (Know Your Customer/Anti Money Laundering) reviews on all potential participants and ensure users satisfy eligibility requirements established by the system and relevant regulations. The system platform will utilize third parties with blockchain applications (and potentially other types of applications), and the platform will be able to access and update information on the identifications of the participants.

By satisfying KYC/AML requirements and meeting the highest regulatory standards, the present system will be able to interact with banks and other financial institutions for its money transmission needs, notably, receiving payments in fiat currency (e.g., USD) from the participants of the platform and the borrowers of the loans, and making payments (e.g., principal and interest to the user(s), and exchange fees from the user(s) for clearing trades) to the designated bank accounts of the sellers of the loans and participants on the platform.

Asset information and application records are stored to a distributed ledger by the application at step 445. The system may store records of asset purchases and dispositions, token transactions, and payments using the distributed ledger architecture.

Users can interact with assets via two-tier blockchain framework, outlined by a two-tier digital asset 1 (DA1) and digital asset 2 (DA2) protocol. The present system utilizes a two-tier blockchain framework for users to interact in a new way with investible assets. DA are tasks and data interactions between Digital Assets and users (i.e., investors). DA1 includes a first set of protocols that enable interactions with assets of a homogeneous type ("Asset"). DA2 builds upon this, and includes a second set of protocols that enables interactions with combinations (a "Portfolio") of portions of specific assets derived from whole specific assets.

Digital asset protocol streamlines process and resource requirements by resequencing interaction nodes and defining dynamic rich data-handling protocols to bring long-needed efficiency to the notoriously asset-rich/resource-poor investment fund model.

DA1 and DA2 significantly amplifies visibility to locate investments users seek and the capacity to obtain and manage those investments. Real-time maps of the asset(s) vis-a-vis counterparties and other asset(s) on a permissioned blockchain will help many stakeholders more effectively perform their functions as asset generators, users (i.e., investors), portfolio managers, regulators, tax agencies, and accountancies. All types of investors can now have democratized access to these investible assets, which historically have been out of reach due to minimum investment amount requirements, privileged access and awareness. Now, all permissioned stakeholders (e.g., users, administrators, and so on) at all times will have improved transparency with mapping tools for assets and participation across the ecosystem, providing a positive shift in the balance of power.

Among the many improvements and innovations, blockchain-enabled digital assets facilitate discoverability, improve transaction quality, reduce counterparty risk, provide transparency, enable customization, facilitate exchange, embed compliance, enrich asset data and history, streamline validation, facilitates customization, unlocks liquidity through information, promotes accurate and dynamic recordkeeping, and facilitates AI-guided investing.

DA1 for Assets and DA2 each comprise several functional elements that administer the logic required by the compliance protocol. Some of these functional elements may include public blockchain and permissioned blockchain interaction and validation protocols, blockchain-enabled permissioning and user (e.g., investor) eligibility rules for different types of assets, dynamic description of different types of asset(s) on permissioned blockchain, embedded compliance into the asset(s)' permissioned blockchain, real-time map of the asset(s) vis-a-vis counterparties and other asset(s) on permissioned blockchain, self-directed discovery protocol to locate asset(s), for a given set of parameters, assisted discovery protocol to locate asset(s) (in some instances, driven by artificial intelligence), validation of token transactions on permissioned blockchain, digital registration and custody of tokens on public blockchain, dynamic recordkeeping of asset(s) transaction history on public blockchain, distributed ledger architecture to record asset purchases & dispositions by platform system managers, token supply, transactions by system of general asset token and specific asset token holders, and principal and interest payments to token holders.

In some instances, control, custody, and safeguarding of cash and tokenized assets on permissioned blockchain and on public blockchain is controlled by logic, rules, and functionality in a custody protocol.

The custody protocol safeguards cash and tokenized assets over the life cycle of assets from creation to end of life cycle using blockchain technology. The ability to safeguard cash and tokenized assets over the life cycle of assets and transactions encapsulates digital asset creation, registration, and ownership in order to conduct activities described in one of more of the other platform protocols. The custody protocols encompass the rules related to the handling and transfer of assets between all operators such as asset generator, digital assets, users (e.g., investors), and network of other users as well as regulators for purposes of ensuring compliance with relevant rules (e.g., custody rule) in domiciles of operation.

The protocols cover mechanisms for holding, permissioning, validating, registering, recording ownership and transactions, and governing handling of client cash and tokenized securities including for newly created tokens, deposits of existing cash and tokens, and transfers related to purchases, sales, and settlements. This includes the validation and permissioning of owners of cash and tokenized securities, as well as validation and permissioning of participants to initiate and settle transactions between owners of such assets.

The custody protocol includes counterpart rules for all technical modules for exchange, as well as additional elements specific to custody. The rules and elements include public blockchain and permissioned blockchain interaction and validation protocols, management of user KYC/AML, IDs, and external accounts, coordination with distributed ledger architecture to record events and history of asset purchases & dispositions by system managers, token supply, transactions by general asset token and specific asset token holders, and principal and interest payments to token holders, coordination with rules governing exchange, residing and updated on permissioned blockchain, and receipt of pricing and aging data from permissioned blockchain for publication on public blockchain. The rules can pertain to validating transactions, reversing transactions, counterparty obligations, and private and public key management and usage. The keys are used for encryption methodologies to safeguard access to user addresses for transactions on the blockchain. The rules and elements can also include delivery and settlement mechanisms, digital storage on side blockchain and physical storage, digital registration on public blockchain of completed transactions, registration of tokenized assets, registration of ownership of tokenized assets, permissioning and validation to write to side blockchain, balance sheet validation and to initiate various transactions on behalf of asset owner, permissioning and validation of transaction, all asset transfers, and to initiate various transactions on behalf of asset owner, and determination of trade and settlement parameters required to initiate, validate, and settle transactions.

Returning to the method of FIG. 4, the value of active general asset tokens and active specific asset tokens is updated at step 450. The fundamental value of a general asset token that is actively held is backed by the value of an unclaimed asset in a general pool, net of amortization, and net of network fees, at a given time. This value changes over time, and is updated in the present system periodically. The fundamental value of a specific asset token is backed by the value of claimed assets removed from the general asset pool, which are created according to bidding and allocation schema established for casting events, net of amortization, and net of network fees, at a given time. This value changes over time, and is updated in the present system periodically. The total fundamental value of an asset on the platform is that of all of the active specific asset tokens plus the equivalent value in unclaimed general pool assets.

Frozen general asset tokens are reactivated and added to the general asset pool at step 455. In some instances, a second round of general asset token generation is performed, wherein general asset tokens are added back to the general asset pool. In some instances, when there are general asset tokens from a prior offering still in the general asset pool, these general assets tokens may be used to create specific asset tokens or assigned a new value based on the value of the new general assets. This is discussed in more detail with respect to the method of FIG. 8.

Compliance verification is performed at step 460. In some instances, compliance verification is performed at least in part according to a compliance protocol. The compliance protocol establishes all logic to actively assure compliance with regulatory matters and internal controls by recording events and event data on the network, extracting data for governance, and enforcing governance and execution schema (e.g., bidding and allocation schema). The compliance protocol actively adjusts the logic to match prevailing operating specifications set by accounting board, securities regulations, technology standards, and other requirements. After performing compliance protocol, the process loops back to step 420, whereby new assets may be deposited to grow the cumulative general asset pool over time. Therefore, updating the general asset pool at step 425 may include adding a subsequent cycle of new assets to the pool, acquired with proceeds received on the sale of reactivated frozen general asset tokens from the repository, and subtracting prior general asset pool assets mapped to specific asset tokens created in a prior cycle. This may be performed periodically or in response to one or more event, such as the reactivation of a general asset or conversion of a general asset token to a specific asset token.

In this capacity of governance, compliance, and internal controls, the compliance protocol will require permission keys and validation regimes to include a range of relevant participants such as auditors, regulators, board members, and custodians. The compliance protocol will function as an exchange mechanism between on-chain and off-chain data, curating requests for external data and internal data between parties.

The compliance protocol helps to establish a compliant platform in the present system operating jurisdictions, and may manage, implement, and/or have access to public blockchain and permissioned blockchain interaction and validation protocols, a legal module, auditor module, KYC/AML module, fraud monitoring module, bidding and allocation schema module, default and restructuring module, corporate finance module, custody and transactions module, trustee module, and a special purpose vehicle SPV module.

FIG. 5 illustrates a method for creating a specific asset token. The method of FIG. 5 provides more detail for step 430 of the method of FIG. 4. First, a casting event is initiated by an application at step 510. The casting event marks the start of a subscription process for general asset token owners seeking to use their general asset tokens to create specific asset tokens.

Next, one or more subscription requests may be received from users owning general asset tokens by an application at step 515. A subscription request defines the ownership stake in available assets in the general pool that are not claimed by other general asset token holders. A subscription request can be made from all or a portion of a general asset token ownership stake. A general asset token holder can use general asset tokens to initiate protocols to create a specific asset token. The general asset token owners can adjust exposure with a custom portfolio during a casting event by submitting subscription requests to specific asset tokens that adjust their exposure. In some instances, specific asset tokens represent ownership share in each unique asset that users want to participate in.

A premium can be received from a user associated with a subscription request at step 520. In some instances, participants may offer a premium to other general asset token owners by contributing some of the value of their general asset tokens to the value of the general asset tokens of the other users.

An allocation of specific asset tokens may be generated by an application in response to the subscription request at step 525. Allocation of specific assets may be implemented using procedures that are well-accepted and well-tested in finance. More details for allocating specific asset tokens is discussed with respect to the method of FIG. 6.

At step 530, a general asset token may be removed from the active status tokens and moved to a repository in response to generated allocation of specific asset tokens. The change in status or "freezing" of the general asset token entails reducing the value to zero, removing the general asset token from active population, and moving the frozen general asset token to repository. By moving general asset tokens from the general asset pool to the repository, the general asset tokens are "frozen" after being used to create specific asset tokens. In step 535, the premiums are distributed from the owner of newly created specific asset tokens to other users in the general pool in settlement of newly created specific asset tokens. This step completes the settlement methodology for creating specific asset tokens.

In some instances, a securitization-in-place (SIP) protocol is used to create and manage specific asset tokens. The SIP protocol creates specific asset tokens on an as-requested basis and sweeps or clears the ecosystem of asset tokens that reach terminal value or otherwise meet removal conditions. The SIP protocol covers tasks and data interactions between asset generator and digital assets. The SIP protocol is activated when it receives instructions from the cascading token protocol (see below) to create specific asset tokens until an asset's value is fully assigned to specific asset tokens created by users and until the asset reaches the end of its life cycle.

Once subscription requests are allocated and priced (subject to governance, ownership limits, and bidding and allocation schema), the SIP protocol begins to create specific asset tokens, representing fractional shares of specific assets. Specific asset tokens can only be created under certain circumstances in an increment established by the SIP protocol rules for that asset. The fractional shares of ownership so created assign value to specific users with pro rata rights and obligations in a ratio reflecting their ownership stake in the underlying asset.

General asset token holders initiate subscription requests during casting events, via cascading token protocol (see below), and determine how much specific asset tokens need to be created. The SIP protocol progressively securitizes the value of the homogeneous asset until the required percentage of the asset has been allotted to specific users (e.g., investors) from the onboarding registry for the general pool in AD/PC. As the SIP protocol securitizes a homogenous asset, it pledges the incremental value to the securitization vehicle, and alerts AD/PC to remove a corresponding amount from general asset token.

Subscription requests are collected from all general asset token holders during casting events, set by AD/PC, and will carry the value of the specific asset aged to that time. Each specific asset token utilizes "Smart Contracts" that embed investment rights and obligations, including age, subscription rights defining percentage of ownership in economic benefits and liabilities, transfer and exchange rights, asset value over the life of the asset, and sunset mechanisms if the specific asset depletes. Specific asset tokens backed by assets may reach a terminal/scrap value or zero value and are burned after exhausting their economic life.

Creation of digital securitized tokens significantly compresses the process, structure, and resources in contrast to traditional securitization of assets. In traditional securitizations, a special purpose vehicle ("SPV") is created. Assets meeting certain characteristics are acquired and transferred into the SPV. Assets are pooled to a target size. New securities are created, backed by the pool of assets, and administered by a trustee. All securities are created at the same time. This process can require 3 months or more. Starting at a cost of $2M or more, this can consume the economics of a deal and preclude creation of new investment product.

The SIP protocol can create digital securitized asset tokens for any asset type, using blockchain-enabled smart contracts to compress the issuance process. Since the securitized asset tokens are created in the platform where the asset is onboarded, it constitutes a "securitization in place." Without the web of asset transfers and SPVs, depending on complexity of the underlying asset and governing securities regulations, the SIP protocol can be ready to create compliant digital security tokens for any asset in 1-4 weeks. After the asset is onboarded and prepared, specific asset tokens can be created on an "as-requested" basis.

This rolling basis securitization presently cannot be done by prior systems. Due to administrative complexity, full securitizations are done for the entire pool and the pricing for the entire pool is set at once, which may be at a premium or discount. Rolling basis securitization ensures that all securities so created can simply be carved out and time-stamped at creation. The fractional ownership share is then priced at the current asset value, avoiding discount pricing through over issuance since the issuance was triggered by a user seeking the specific asset token. The effort to create the incremental specific asset token is streamlined through electronic instructions, and the inventory is calculated and tracked through distributed ledger.

In addition to the rolling basis securitization, another SIP protocol innovation is the sweep mechanism that "burns" specific asset tokens that reach sunset conditions. The sweep mechanism is an innovation that traditional securitization procedures do not provide. Asset securitization using an SPV involves the use of trustees and is a document and resource intensive process. This protocol creates a self-cleaning securitization process. Thus, while fractional shares of specific assets are created on a rolling basis, all specific asset tokens for the same asset shall sunset at the same time.

The SIP protocol performs several critical functions for each new asset onboarded to the ecosystem, and completes once an asset is fully assigned or sunsets. These functions include public blockchain and permissioned blockchain interaction and validation protocols, blockchain-enabled description of original asset that an asset generator onboards onto platform, including value and expense/payment waterfalls and shadow ratings, done on permissioned blockchain, dynamic valuation protocol to reflect asset value as it ages, done on permissioned blockchain and published on public blockchain periodically, establish increment for asset fractions, in coordination with participation windows set by AD/PC, receive instructions from Cascading Token Protocol to create fractional shares of specific assets, with unique identifiers, from the original asset on permissioned blockchain, creation of identification badge, including assignment to registered user(s) (e.g., investor(s)) on permissioned blockchain, creation of smart contract containing rights and obligations underlying each fractional share of the digital specific asset token on permissioned blockchain, digital registration and custody of specific asset tokens on public blockchain, once triggered by a general asset token election in the cascading token protocol, periodic validation and recording of specific asset token value on the public blockchain, rewards protocol (e.g., principal and interest) for payments, governed by smart contract, on permissioned blockchain for general asset token and specific asset token, recording performance status on public blockchain, settlement protocol to reflect an asset that reaches a terminal value or zero value ("burn") and sweeps and manages the active inventory of asset tokens on the permissioned blockchain and public blockchain, periodic validation and "burn" of specific asset tokens at settlement on the public blockchain, and actively record ownership of specific asset token holders.

The Cascading Token Protocol (CT protocol) contains rules for users (e.g., investors) and asset generators to interact with each other, both at regular intervals and on a rolling basis. The CT protocol executes and/or operates alongside the AD/PC Protocol, another set of rules between users and asset generator, and is activated by switch mechanisms from AD/PC. The CT protocol returns results to AD/PC that controls the status of the general asset token and calculates the corresponding creation of specific asset tokens.

Users (e.g., investors) and asset generators interact with each other using a combination of general asset tokens and specific asset tokens. General asset tokens are sold to users to raise funds to purchase assets for onboarding onto the blockchain. General asset tokens are evergreen, or in perpetual existence, in that they can be removed from an asset pool and placed in a repository, and then re-introduced into the asset pool for subsequent offerings. For each homogeneous asset type, the SIP protocol creates compliant digital investment product, or specific asset tokens on the blockchain, representing fractional shares of the homogeneous asset type. Specific asset tokens may reach a terminal value or zero value and are burned after exhausting economic life. The CT protocol also performs the calculations to translate the premium an investor pays to create specific asset tokens into additional ownership stake in remaining unclaimed assets.

Initially, the entire value of specific asset tokens belongs to a general pool in the ecosystem, unassigned to any particular user. Although unassigned to any particular user, the value assets onboarded with DA1 and any economic benefits belong to the ecosystem. It supports a rewards system for users who purchased general asset tokens that funded the underlying assets.

At regular intervals called casting events, users holding general asset tokens can use those tokens to create a custom DA2 Portfolio from combinations of fractional shares of DA1 Assets. In this way, a general asset token can be used to create "cascade" portfolio of many specific asset tokens equal to the value of the general asset token.

The CT protocol is a key protocol to defining how asset generators and investors interact. This innovation allows Investors to create custom portfolios on a pooled platform, for the first time. This protocol is crucial to give investors the unique flexibility to invest in whole deals or a self-directed mix of investments, while the platform administrators can continue to search for assets to re-load the pipeline.

The CT protocol also democratizes the bidding and pricing mechanism for specific asset tokens. Since subscription requests re-allocate ownership interests across the pool of investors, participants seeking to increase their stake in specific assets must offer a premium to other owners by contributing a portion of the value of their general asset tokens to the value of the general pool. Allocations are then made based upon a democratic bidding and allocation schema, which is applied to bids received within the announced participation window begin and end dates/times. The bidding and allocation schema provides rules for allocation, for example based on a Dutch auction process. Users place a bid for the amount they are willing to buy and the price. Once the bids are received, allocations are made from highest bid to lowest bid. The price paid is the minimum successful bid that receives an allocation. The bidding and allocation schema can be modified over time according to the present platform's governance rules.

The CT protocol contains several technical modules and functionalities. These modules and functionalities include public blockchain and permissioned blockchain interaction and validation protocols, a mechanism for hosting a participation window on permissioned blockchain and recording outcome on public blockchain, creation of smart contract containing rights and obligations underlying cascading token mechanism, involving the use of general asset token to participate pro rata in specific asset tokens, protocol for updating activation status of general asset token, before and after consumption in a participation event, blockchain-enabled dynamic record of general asset token inventory via AD/PC protocol, protocol for updating assignment of specific asset token "ownership" on identification badge, and removal from general pool inventory, and establishment of a compliant program to announce to existing general asset and specific asset token holders on the platform the availability of new onboarded/unclaimed assets or general asset tokens available for purchase (initial sale and subsequent auctions). These can include details specific to the underlying asset in the case of the specific asset token, or details specific to the general asset token.

Figure 6:
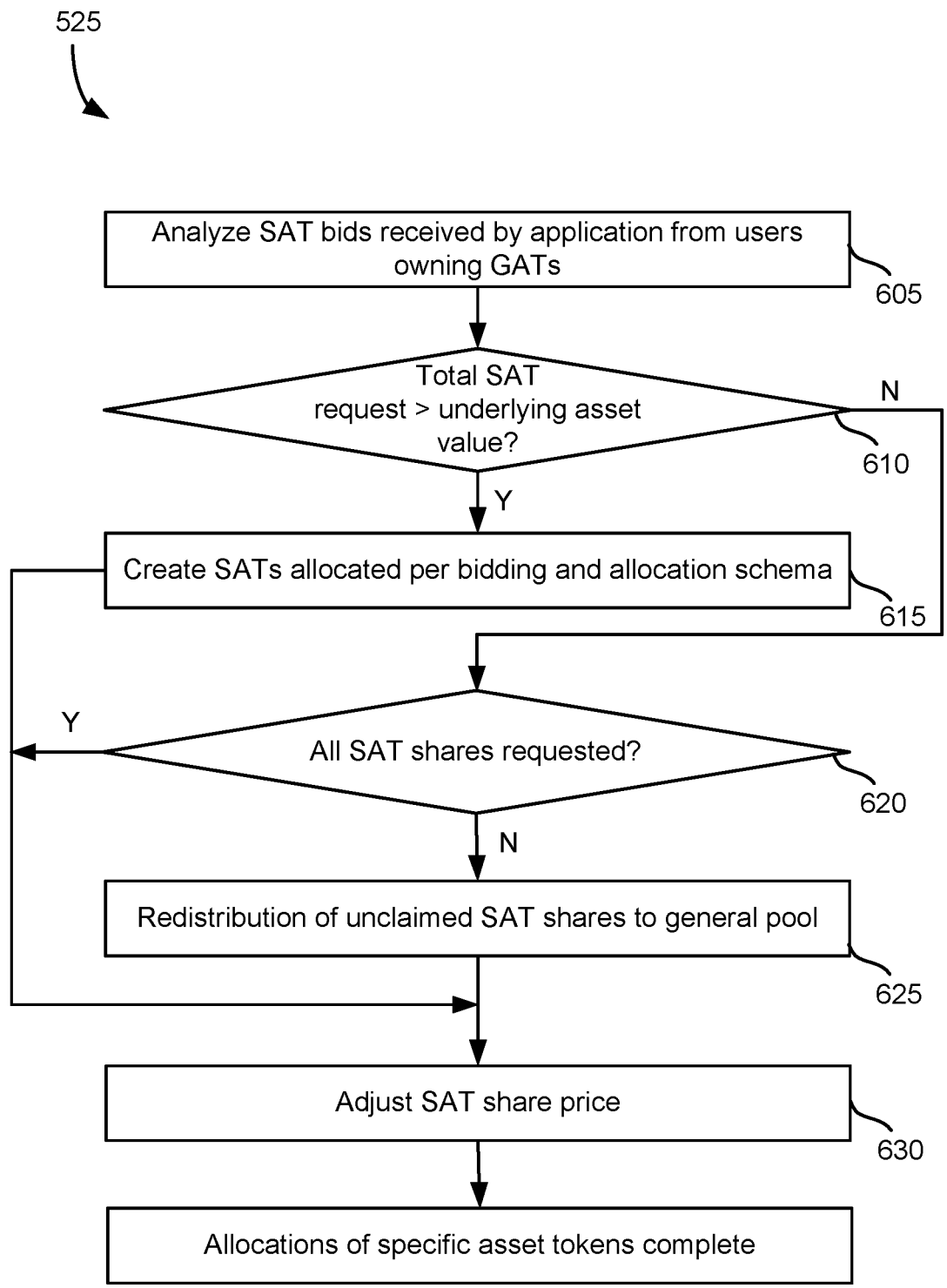
FIG. 6 illustrates a method for generating allocation of specific asset tokens.

FIG. 6 illustrates a method for generating allocations of specific asset tokens. The method of FIG. 6 provides more detail for step 525 of the method of FIG. 5. Specific asset token bids received by applications from users owning general asset tokens are analyzed at step 605. A determination is then made as to whether the total specific asset token requests are greater than the underlying asset value at step 610. If the total requests are not greater than the underlying asset value, then a determination is made at step 620 as to whether all specific asset token shares have been requested. If not all specific asset token shares have been requested, the application redistributes unclaimed SAT shares to other users in the general pool.

Returning to step 610, if the total specific asset token requests are greater than the underlying asset value, specific asset tokens are created and allocated per bidding and allocation schema at step 615.

Whether all specific tokens are oversubscribed, fully requested or partially requested, the method in FIG. 6 completes at step 630 to adjust specific asset token share price. At step 635, the allocations of specific asset tokens are complete. In some instances, a Dutch auction may be used to allocate assets, which is similar to what is used in Treasury bill auctions. An example of a Dutch auction is as follows. A specific asset may have 100 units available. Initially, 5 users or owners have 20 specific asset token allocations worth 20 general token units each. Five owners all want to create 25 units each of specific tokens, which means the specific asset would be oversubscribed by 25 units. Owner 1 puts in a premium bid of 1.2 general tokens to create each of 25 specific unit, owner 2 puts in a premium bid of 1.15 for each of 25 units, owner 3 puts in a premium bid of 1.15 for each of 25 units, owner 4 puts in a premium bid of 1.1 for each of 25 units, owner 5 puts in a premium bid of 1.1 for each of 25 units. The bids are ranked from highest premium bid to lowest, and the quantity is allocated from highest premium bid until all 100 units are allocated for the asset. In this case, owner 1 gets rights to create 25 specific token units, owners 2 and 3 each get to create 25 units each because they have equal second highest bids, and owners 4 and 5 have equal third highest bids, but there are not enough units left to satisfy the full 50 units. Instead, they will get rights to create half each of what remains, which is 12.5 units apiece. In this Dutch auction example, the clearing price will be 1.1 general tokens, which is the lowest allocated bid. Therefore, a 10 general token premium is paid by winning bidders to those who end with fewer than 20 specific tokens. Owners 4 and 5 receive a premium of 5 general tokens apiece, to compensate for a reduced holding of 12.5 (versus original 20) specific tokens.

Figure 7:
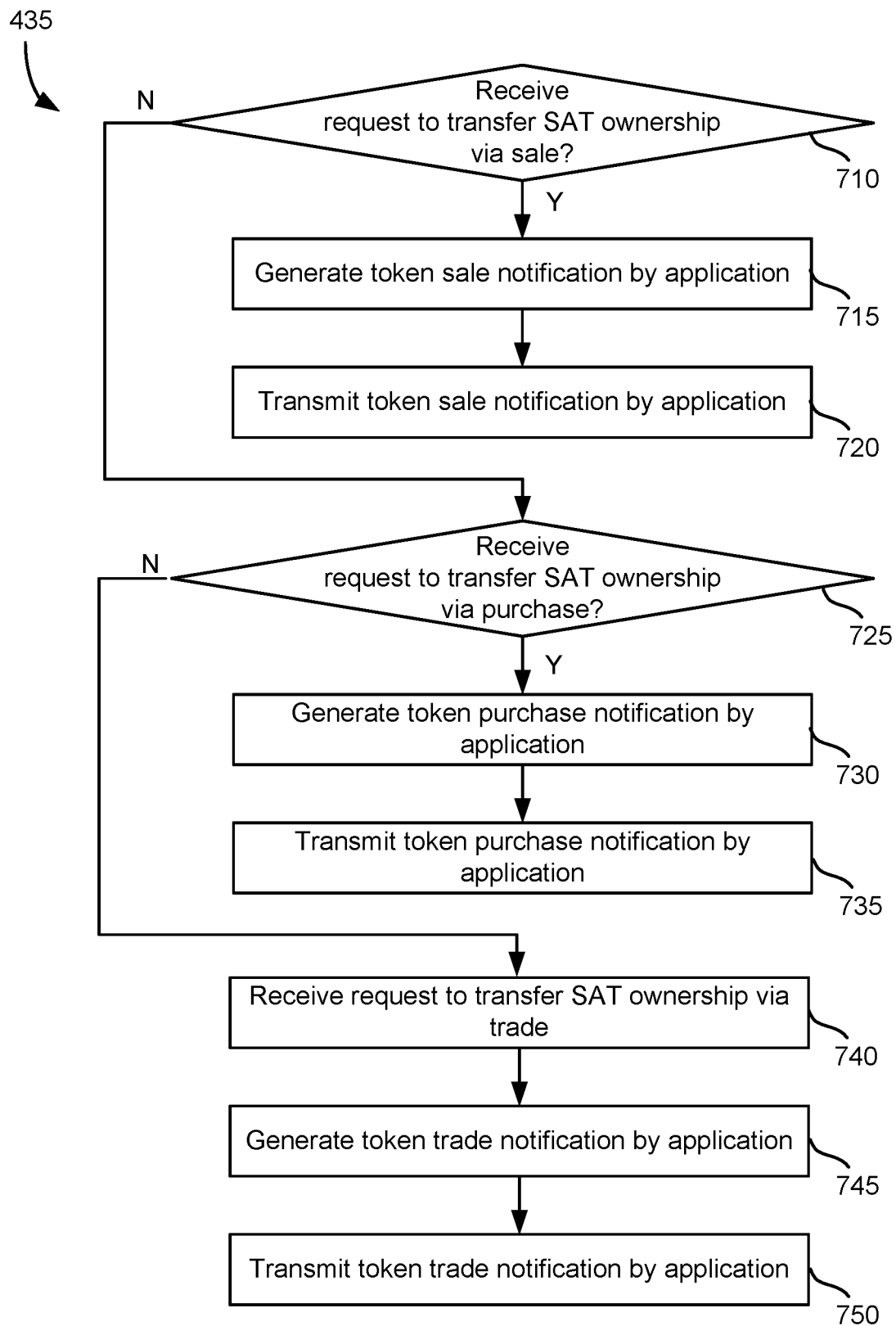
FIG. 7 illustrates a method for processing token transfers between a first user and a second user.

FIG. 7 illustrates a method for processing token transfers between a first user and a second user. The method of FIG. 7 provides more detail for step 435 of the method of FIG. 4. A determination is made as to whether a request to transfer specific asset token ownership via sale is received at step 710. If a request to sell specific asset token ownership is received at step 710, a token sale notification is generated by the application at step 715. The token sale notification may be transmitted to users and a distributed ledger at step 720. A determination is made at step 725 as to whether a request to transfer specific asset token ownership via a purchase is received. If a request to transfer tokens via purchase is received, a token purchase notification is generated at step 730, and the token purchase notification is transmitted by the application at step 735. The purchase notification may be sent to the involved users as well as a distributed ledger system, and in some instances can be reported to other systems or machines.

A request may be received to transfer specific asset token ownership via a trade between multiple users at step 740. A token trade notification may be generated by the application at step 745, and the notification may be transmitted by the application at step 750. The notification may be transmitted to users involved in the trade, other users having general asset tokens and/or specific asset tokens, and to a distributed ledger system, and in some instances can be reported to other systems or machines.

In some instances, users holding general asset token and specific asset token holders are allowed to exchange their tokens among themselves within the system platform for an exchange fee to be paid to the platform administrator in fiat currency. The exchange fee will be a percentage of the dollar amount of the exchange transaction.

For these exchanges, whole or partial exchanges of tokens associated with each user are allowed. The mechanism to calculate and communicate equivalent value among the different token holders will be based on the underlying assets supporting the value of the general asset token or specific asset tokens. Also, a current user or new user is allowed to "bid" for the tokens of another token holder, using other specific asset tokens or general asset tokens or fiat currency to transfer value. Conversely, any investor holding a general or specific asset token can "offer" for to sell their token to a current user or new user. The current platform provides a marketplace to announce and curate trades across the network of current token holders and other eligible new investors for the above "bid and offer".

The current platform also facilitates listing of specific asset tokens (but not general asset tokens) on external exchanges. The present system can utilize an existing licensed exchange. In some instances, the system can provide exchange capabilities for general and specific asset tokens in the longer term. The goal is to afford platform users the greatest flexibility to exchange between a broad mix of tokens and to also provide AI-driven recommendation and portfolio building tools specific to system tokens.

The present system also helps general asset token users to choose which underlying specific asset token(s) to create through the use of machine learning/AI to help them make that choice. This includes an AI led guided decision process. The AI would find the best match between that specific user (e.g., investor) and assets that would be best for their needs based on the specific investment profile, objectives and criteria of the user (e.g., investor). Conversely, the AI also identifies current assets that violate investment objectives of the specific investor or certain conditions they specify and recommend dislodging that asset. In effect, the current platform will create liquidity in the underlying asset through data, rather than just using capital.

In some instances, the present system may implement an exchange protocol having rules for users to interact with each other across the network of users, both at regular intervals and on a rolling basis.

The goal is to afford platform users the greatest flexibility to exchange between a broad mix of tokens and to also provide recommendation and portfolio building tools. While the present system can have an external listing of specific asset tokens (but not general asset tokens) on an alternative exchange, the rules for exchange and eligibility of users to participate/own the tokens will be set by the system exchange rules.

This module also collects relevant transaction fees for facilitating the exchange. The ability to exchange digital assets greatly improves the liquidity of investible assets of all types. For certain asset types, such as project finance assets, this will provide liquidity for the first time.

The Exchange protocol contains several technical modules and functionalities. These modules and functionalities include public blockchain and permissioned blockchain interaction and validation protocols, management of investor's KYC/AML, IDs, and external accounts, coordinate with distributed ledger architecture to record events and history of asset purchases & dispositions by platform managers, token supply, transactions by platform general asset token and specific asset token holders, and principal and interest payments to token holders, coordination with rules governing exchange, residing and updated on permissioned blockchain, receive pricing and aging data from permissioned blockchain for publication on public blockchain, rules for validating transactions, reversing transactions, and counterparty obligations, and delivery and settlement mechanisms In some instances, the system may offer subsequent offerings of general asset tokens to users. The present system uses the repository to freeze the general asset tokens after they have been used by their owners to create specific asset tokens. The frozen general asset tokens will be pooled and offered to new owners to facilitate additional round(s) of asset purchases. Future offerings will re-set the new price for general asset tokens.

At the time of a future offering of the general asset tokens from the repository to raise new cash in a Round 2, there may be some general asset token holders in Round 1 who have not submitted subscription requests to create specific assets (choosing instead to own a stake in the general pool). Ahead of the round 2 offering, round 1 general asset token holders will be given two choices: 1) They will be given the option to turn in their general asset tokens, ahead of Round 2 offering, to create specific asset tokens reflecting their stake in the remaining pool of Round 1 unclaimed assets. Different from the bidding process used for Casting events, this would just be the pro-rata asset mix of all general token holders. Or, 2) if, instead, the round 1 general asset token holders choose not to create round 1 specific asset tokens ahead of the round 2 offering, they will be forced to "reset" their general asset tokens from round 1 to round 2 valuation levels.

In a "reset", the new value level will be based on the pricing of round 2 offering, relative to the actual remaining value of general asset token round 1—which is the original cost of the round 1 general asset token, less the amount of cash (excluding loan interest) that has been paid to that general asset token holder before round 2 takes place. The "reset" ratio is a very specific number which is calculated based on the remaining round 1 value and the new round 2 offering price. The conversion of the round 1 general asset token into round 2 general asset token will therefore be exact.

The objective of this "reset" is that it will allow round 1 and round 2 general asset token holders to be at the same parity, in terms of the value to create specific asset tokens, with the same rights and cashflows from the combined pool of unclaimed assets from round 1 and unclaimed assets purchased after round 2 of general asset tokens has been auctioned.

For example, assume 100 general asset tokens were created in the initial issuance at $10/token. Of this supply, 98 general asset tokens have been turned in to the system repository as they were used to create specific asset tokens. Due to amortization, the value of each of the two unused round 1 general asset tokens is $7.50 at the end of 12 months.

At the end of 12 months, the system announces it will auction the 98 general asset tokens for $10/token. Ahead of the auction, 1 of the round 1 general asset token holders turns in his token to create specific asset tokens for half of the unclaimed asset pool remaining from Round 1. The other round 1 general asset token holder does not turn in his general asset token, and round 2 offering is completed. Since the remaining value of round 1 general asset token was $7.50, and the round 2 auction is at $10/token, the holding of the round 1 general asset token holder will be adjusted to 0.75 general asset tokens, in a forced "reset" that now brings him to parity with general asset tokens auctions in a round 2. Thus, the total number of general asset tokens offered at round 2 will be updated to 99 (98 plus the 1 general asset token submitted immediately before the auction). Total number of round 2 general asset tokens will be 99.75 (99 plus 0.75 with the forced reset of the round 1 general asset token).

Round 1 and round 2 general asset tokens are now at parity and have rights to creates specific assets out of the combined pool of unclaimed assets from round 1 and assets purchased using proceeds from the offering of round 2 of general asset tokens.

In the above example, the round 1 offering of general asset tokens was adjusted down to 0.75 general asset token due to the round 2 offering at 1.0. That 0.75 general asset token, when multiplied by the new total proforma outstanding general asset token value*, reflects the adjusted purchasing power (% stake) of the 0.75 general asset token holder if he participates in future Casting events.

*A=B/C where:

A=New total proforma outstanding general asset token value;

B=New total proforma unclaimed assets, i.e., the sum of the remaining unclaimed round 1 asset pool & new round 2 asset pool; and C=total proforma number of outstanding general asset tokens.

The present system will announce to existing general asset and specific asset token holders on the platform when a casting event will be held. Through the trading protocol, the system will allow members and the public to see which specific asset tokens are being offered for sale by current owners. Specific asset tokens can be purchased by eligible users with fiat currency or by exchanging other system asset(s).

Figure 8:
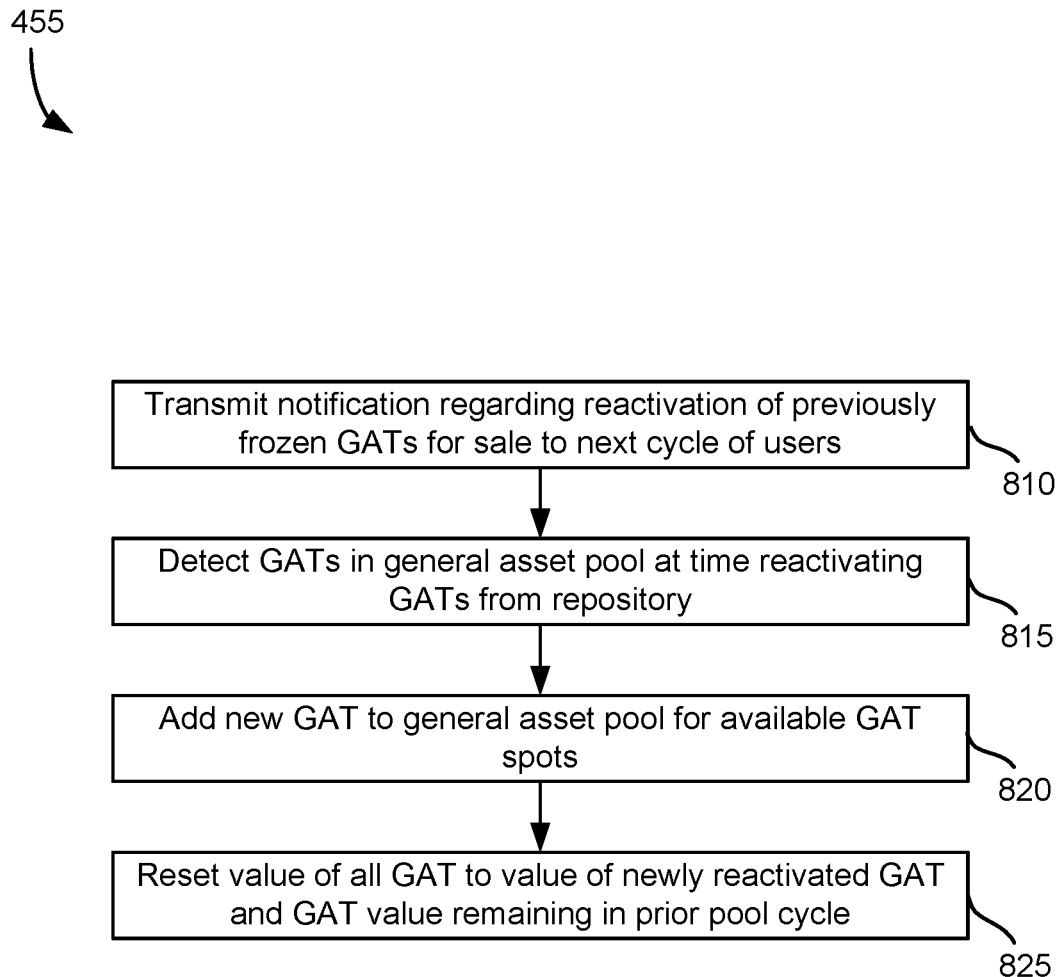
FIG. 8 illustrates a method for reactivating frozen general asset tokens.

FIG. 8 illustrates a method for reactivating frozen general asset tokens. The method of FIG. 8 provides more detail for step 455 of the method of FIG. 4. The notification regarding the use of general asset tokens to create specific asset tokens is transmitted to users associated with the general asset tokens at step 810. The notification may indicate to the users the options for using the general asset tokens to create specific asset tokens. General asset tokens and a general asset pool are detected at the time of addition of reactivating general asset tokens from repository at step 815.

The previous general asset token is then removed from a general asset pool at step 835. New general asset tokens are added to the general asset pool for the available general asset token spots at step 820.

At step 825, the methodology maps the value of all reactivated general asset tokens and general asset tokens left from prior rounds to the new general asset pool which includes the addition of new general pool assets acquired in each new cycle plus general pool assets that were not used to create specific assets in any prior pool cycle.

Figure 9:
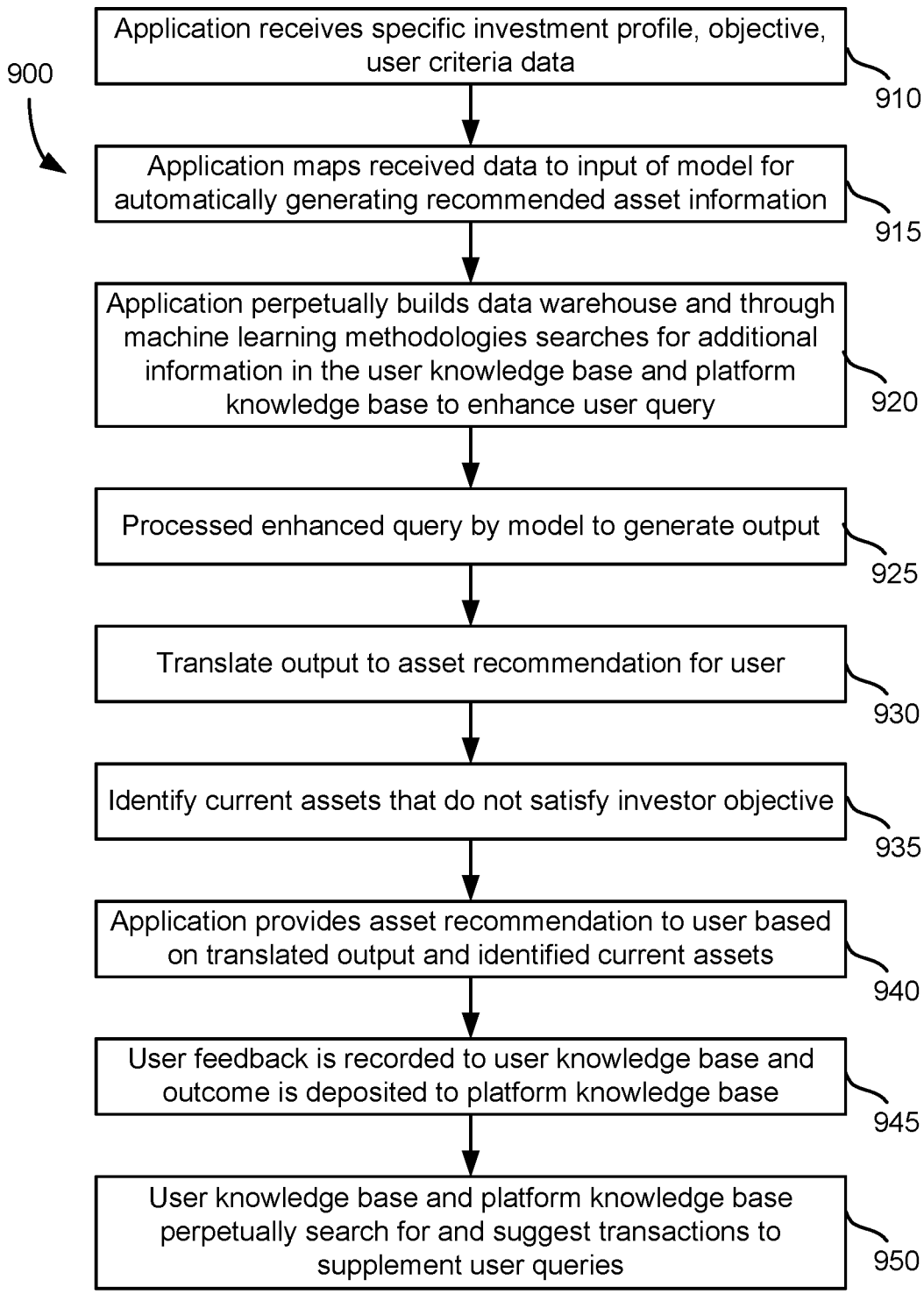
FIG. 9 illustrates a method for automatically providing an asset recommendation to a user.

FIG. 9 illustrates a method for automatically providing an asset recommendation to a user. An application can receive user specific investment profile objectives and user criteria data at step 910. The investment profile data may include the types of investment or preferences the user has, such as for example domestic versus foreign assets, different industries or technologies, and other preferences. An objective may indicate whether a user wants to grow value, receive cash, or other objectives.

An application maps the received data to input of a model for automatically generating recommended asset information at step 915. In some instances, the model may be a neural network or other machine language model which uses artificial intelligence to determine which assets best match a user investment profile, objective and other criteria.

Application perpetually builds data warehouse and through machine learning methodologies shops for additional information in the user knowledge base and platform knowledge base to enhance user query The received input is transformed into an enhanced query and processed by the model to generate an output at step 925. Many users with limited analytical resources may pose simple queries, especially in queries of unfamiliar asset types and jurisdictions. To solve this limitation that constrains the quality of analysis by users, the methodologies in 925 use data analytics and machine learning techniques to relate received inputs to broader data sets and trends accumulated by the platform from on-chain and off-chain sources and models, thereby broadening the dimensions of the original search query into an "enhanced" query. The output of the models is translated to asset recommendations for the particular user at step 930.

Current assets that do not satisfy investor objectives are identified at step 935. In some instances, the system will analyze the currently held assets of the user to determine if any assets in the user's portfolio did not satisfy the users investment profile, objective, or other criteria. The application provides asset recommendations to the user based on the translated output of the model and the identified current assets at step 940.

At step 945, user feedback is recorded to user knowledge base and outcome is deposited to platform knowledge base. User knowledge base and platform knowledge base perpetually searches for and suggest transactions to supplement user queries in step 950. Complementary to the methodologies in 925, step 950 uses data analytics and machine learning techniques to relate received inputs to broader data sets and trends accumulated by the platform from on-chain and off-chain sources and models to identify patterns, relationships, and actively inform users. The use of technology and information to promote activity is essential for solving financing of large scale assets, particularly where illiquidity hampers traditional markets.

In some instances, portfolio management may be handled by a portfolio management (PM) protocol implemented by the present system. The PM protocol is a suite of protocols for users as investors to manage self-directed investments, with added intelligence of AI-driven recommendation tools. The PM protocol allows the user to engage with the digital assets to transmit investment goals and execute underlying rights and obligations.

Once assets have been acquired by the administrators of the present system, the holders of the general asset tokens and specific asset tokens will receive cash flows from the assets, which reduce the token value as follows: the specific asset token holders will receive cash flow (loan principal and interest payments less platform management fees) from the specified underlying assets that are represented by the specific asset tokens which they are holding. Likewise, the general asset token holders will receive activity cash flow (loan principal and interest payments less platform management fees) from the underlying assets in the general pool.

Users as investors pay a fee for operating the platform, including technology and creating and replenishing inventory. The network fees are partly a function of the outstanding amount of the loan assets (and not the tokens) at the beginning of a payment period (every fiscal quarter or pro rata thereof for the first payment period). General and specific asset token holders receive investment proceeds in fiat currency, net of fees.

The PM protocol contains several technical modules and functionalities. Some of the modules and functionalities include public blockchain and permissioned blockchain interaction and validation protocols, protocol for dynamically updating the value of any general asset tokens actively held on permissioned blockchain, protocol for dynamically updating the pro rata value of unclaimed assets in the general pool on permissioned blockchain, protocol for dynamically updating the value of active asset tokens on permissioned blockchain and public blockchain, protocol for registering users of the platform, protocol for associating users with general asset tokens and specific asset tokens, protocol for managing premium Rewards on permissioned blockchain, protocol for managing Network Fees due on permissioned blockchain, payments protocol for transmission of Rewards and Value on permissioned blockchain and on public blockchain, and protocol to "Settle" asset tokens at loan maturity (Value), whether due to refinance or terming out on permissioned blockchain and public blockchain In some instances, portfolio monitoring may be performed by an Analytics protocol. The Analytics protocol is a suite of portfolio tools including portfolio monitoring, risk assessment, and scenario analysis, and uses AI and machine learning concepts to utilize external data and data extractions to produce recommendations according to user-defined investment objectives.

The platform assists token investors to choose which underlying asset token(s) to convert into and which assets to exchange for, via an AI led guided decision process (described in a separate protocol). This is the first truly intelligent token that can dynamically assemble, cull, and regroup the components.

The AI component seeks the best match between that specific user (e.g., investor) and assets based on the specific investment profile, objectives and criteria of the user. Conversely, the AI identifies current assets that violate investment objectives of the specific user or conditions they specify and recommend dislodging that asset.

The AI protocol is trained by proprietary data analytics on industry data as well as present system data flows and transactions. The AI protocol includes functionality such as public blockchain and permissioned blockchain interaction and validation protocols, scenario builder module, stress testing module, objectives builder, a recommendation tool, and a performance assessment module.

Figure 10:
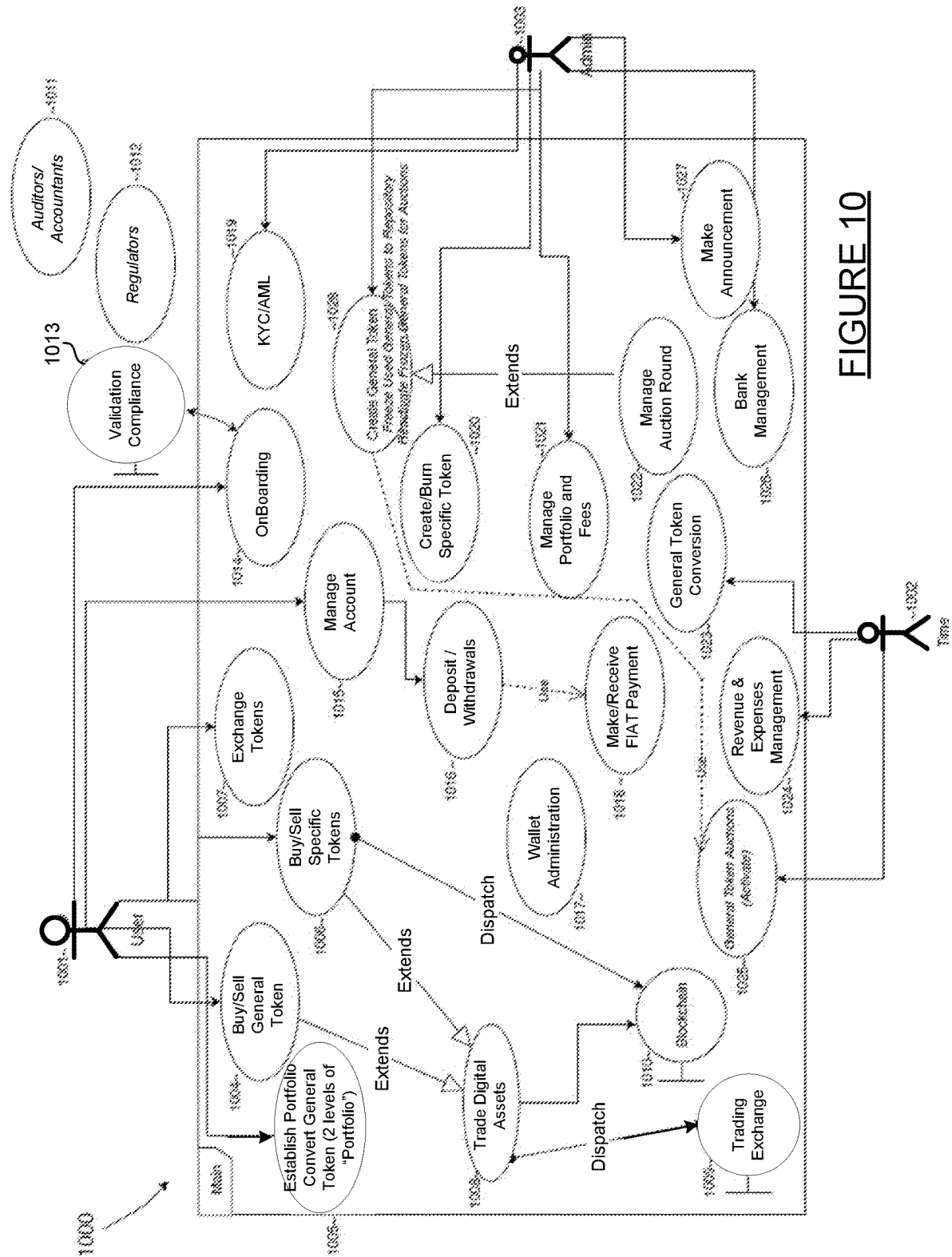
FIG. 10 illustrates a block diagram of a schematic of user cases for a two-tier tokenization platform.

FIG. 10 illustrates a block diagram of a schematic of user cases for a two-tier tokenization platform. In the schematic of FIG. 10, a user 1001 can buy and sell general tokens at 1004 and trade digital assets at 1008. The digital assets rates may be done through an exchange 1009. The user may also establish a portfolio and convert general tokens at 1005. User may further exchange tokens at 1007, buy and sell specific tokens at 1006, which are then recorded onto blockchain 1010.

User 1001 may manage an account at 1015, including making deposits and withdrawals at 1016 and can make and receive payments at 1018. Wallet administration may be performed at 1017.

A user may be on boarded at 1014, and may be validated as an accredited investor at 1013. An admin may perform research on users of the system at 1019, and then may create general tokens and other token operations at 1028, including freezing used general tokens to repository and reusing frozen general tokens for auctions. The general token auctions may be implemented at 1025.

An admin of the present system may also create and burn specific tokens at 1020, managed portfolio fees at 1021, and make announcements at 1027. An administrator may also perform bank management at 1026. Management of connectivity to payments intermediaries is essential for managing value transfer across applications and protocols, where "banks" may refer to traditional institution as well as digital providers of payment intermediation including providers of hot and cold storage of cryptographic assets. Over time, revenue and expense management occurs at 1024, and general token conversion occurs at 1023. Auditors and accountants 1011 may interact with the system as well as regulators 1012.

Figure 11:
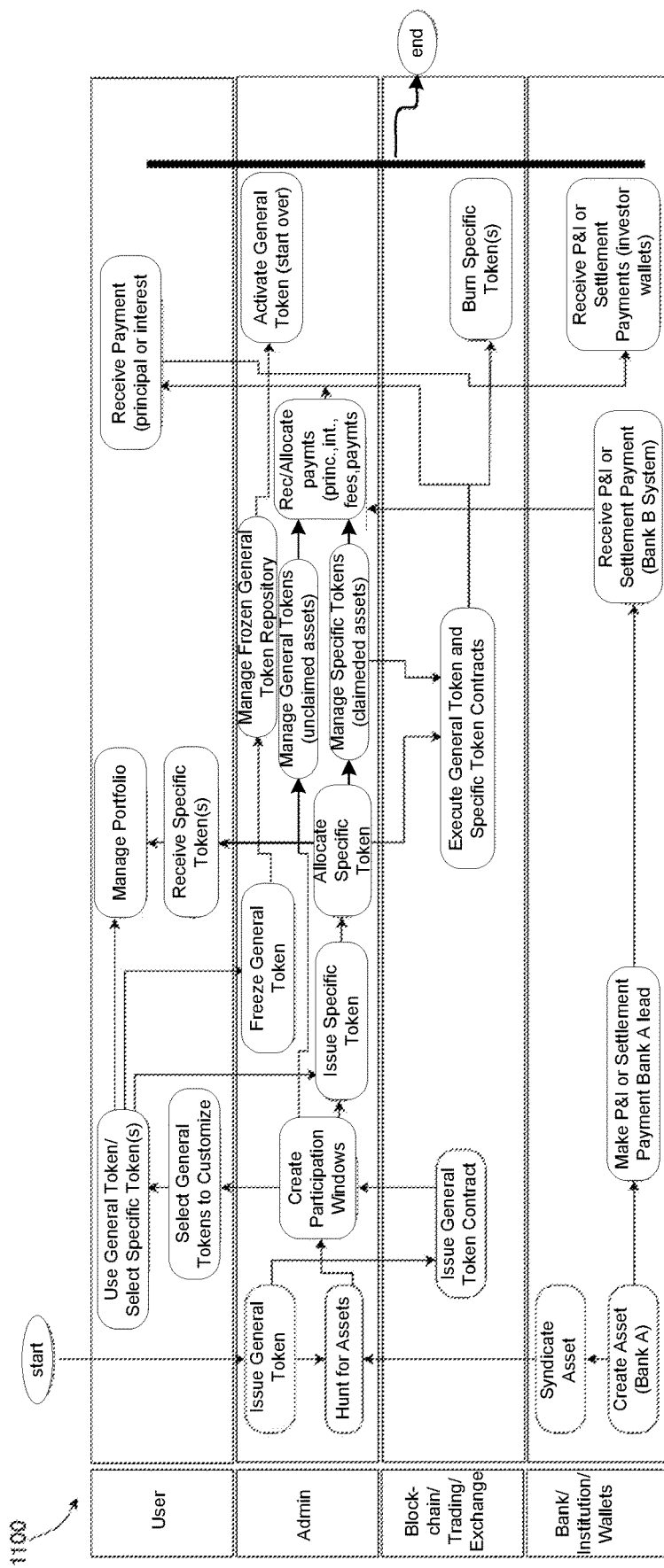
FIG. 11 illustrates a block diagram of an activity flowchart for a two-tier tokenization platform.

FIG. 11 illustrates a block diagram of an activity flowchart for a two-tier tokenization platform. An activity flowchart 1100 of FIG. 11, and infrastructure loan (as an example) may be made by bank "A", which may lead to a syndicated loan, which then may be acquired as part of a search for assets by an administrator ("admin"). The admin may issue general tokens, and a general token contract may be stored on the blockchain distributed ledger system. Participation Windows may be generated by an admin, after which users may select general tokens to customize and use general tokens to select specific tokens. A user may then manage their portfolio, in some instances in response to receiving specific tokens. Once the user selects a specific token, the admin may freeze the general token from which the specific token was generated. The frozen general tokens are managed in a token repository until they are activated for a subsequent offering. In response to creating Participation Windows, specific to tokens may be issued, allocated, and managed. General asset tokens may also be managed as unclaimed assets, and payments may be received and allocated, including for example principal and interest, fees, and other payments. Bank "A" which made the (example) infrastructure loan may receive a settlement payment. After receiving and allocating payments, an admin may activate general token, the blockchain may burn a specific token, and the bank may receive settlement payments.

In commercial terms, the two-tier tokenization digital assets platform delivers technology innovations covering four main commercial areas such as initial issuance and offering of general asset tokens & creation of specific asset tokens, subsequent offerings of general asset tokens, payments related to general asset tokens and specific asset tokens, and trading of platform tokens between token holders The platform of the present technology will periodically offer general asset tokens to new or existing investors through the platform for a handling fee as a percentage of the offering price. The general asset tokens are evergreen tokens. After they are issued to the initial investors, any general asset token used to create specific asset tokens will be frozen. A frozen general asset token can be reactivated for future offering rounds, as a proxy for "secondaries" versus new issues. The repetitive cycle of freezing and reactivation makes the general asset token "evergreen."

In contrast to general asset tokens, specific asset tokens are created and burned, or amortized down over time as the underlying loan asset is paid off. General asset token holders use their general asset tokens to initiate a series of protocols to create specific asset tokens through subscription requests. Subscription requests are collected from general asset token holders who want to participate in the casting event in order to create customized exposures to specific assets.

All transactions and assets on the platform are initially denominated in fiat currency. The present platform may select a base fiat currency for accounting purposes, and may incorporate other currencies over time. In some instances, assets in other countries may be denominated and processed in their local currency and the present system will make conversion determinations to its effective base currency according to prevailing business and tax regulations.

Distributed ledger architecture keeps records of asset purchases and dispositions by the framework system, token transactions by the general and specific asset token holders, and payments between the platform and token holders.

In addition to the platform's own blockchain technology, which may utilize a combination of permissioned and public blockchain, the platform will also be interoperable with decentralized technology applications, including accepting certain external tokens and interacting with external wallets and crypto exchanges.

Figure 12:
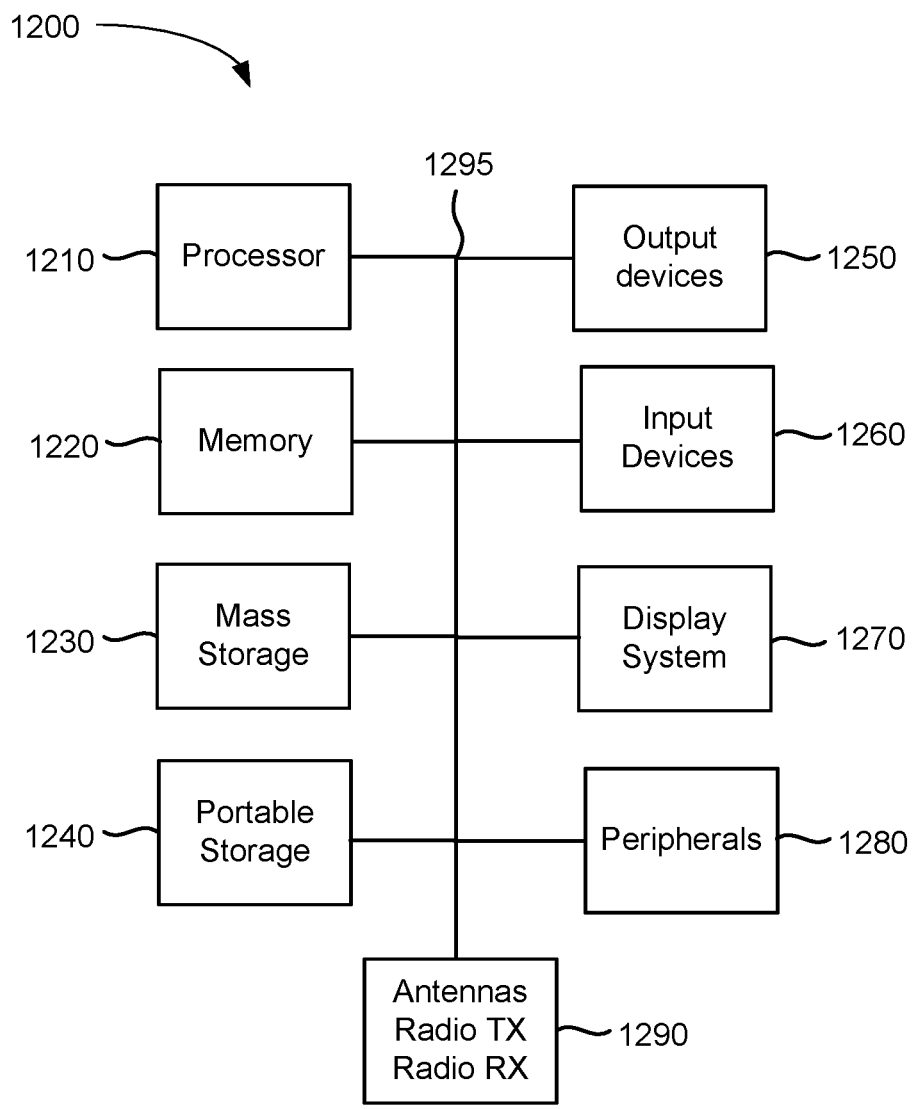
FIG. 12 illustrates a block diagram of a computing environment for implementing a two-tier tokenization platform.

FIG. 12 illustrates a block diagram of a computing environment for implementing a two-tier tokenization platform. System 1200 of FIG. 12 may be implemented in the contexts of the likes of user machines 110, 120, and 130, server 150, administrator machine 170, data store 180, and distributed ledger machines 190. The computing system 1200 of FIG. 12 includes one or more processors 1210 and memory 1220. Main memory 1220 stores, in part, instructions and data for execution by processor 1210. Main memory 1220 can store the executable code when in operation. The system 1200 of FIG. 12 further includes a mass storage device 1230, portable storage medium drive(s) 1240, output devices 1250, user input devices 1260, a graphics display 1270, and peripheral devices 1280.

The components shown in FIG. 12 are depicted as being connected via a single bus 1290. However, the components may be connected through one or more data transport means. For example, processor unit 1210 and main memory 1220 may be connected via a local microprocessor bus, and the mass storage device 1230, peripheral device(s) 1280, portable storage device 1240, and display system 1270 may be connected via one or more input/output (I/O) buses.

Mass storage device 1230, which may be implemented with a magnetic disk drive, an optical disk drive, a flash drive, or other device, is a non-volatile storage device for storing data and instructions for use by processor unit 1210. Mass storage device 1230 can store the system software for implementing embodiments of the present invention for purposes of loading that software into main memory 1220.

Portable storage device 1240 operates in conjunction with a portable non-volatile storage medium, such as a floppy disk, compact disk or Digital video disc, USB drive, memory card or stick, or other portable or removable memory, to input and output data and code to and from the computer system 1200 of FIG. 12. The system software for implementing embodiments of the present invention may be stored on such a portable medium and input to the computer system 1200 via the portable storage device 1240.

Input devices 1260 provide a portion of a user interface. Input devices 1260 may include an alpha-numeric keypad, such as a keyboard, for inputting alpha-numeric and other information, a pointing device such as a mouse, a trackball, stylus, cursor direction keys, microphone, touchscreen, accelerometer, and other input devices. Additionally, the system 1200 as shown in FIG. 12 includes output devices 1250. Examples of suitable output devices include speakers, printers, network interfaces, and monitors.

Display system 1270 may include a liquid crystal display (LCD) or other suitable display device. Display system 1270 receives textual and graphical information and processes the information for output to the display device. Display system 1270 may also receive input as a touchscreen.

Peripherals 1280 may include any type of computer support device to add additional functionality to the computer system. For example, peripheral device(s) 1280 may include a modem or a router, printer, and other device.

The system of 1200 may also include, in some implementations, antennas, radio transmitters and radio receivers 1290. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1200 of FIG. 12 are those typically found in computer systems that may be suitable for use with embodiments of the present invention and are intended to represent a broad category of such computer components that are well known in the art. Thus, the computer system 1200 of FIG. 12 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

What is claimed is:

1. A method for providing a multi-tier tokenization platform, comprising:
   generating one or more general asset tokens based on a general asset pool by a token manager on an administration server, the token manager stored on the administration server and generating the one or more general asset tokens which are based on an asset protocol, the asset protocol stored in a distributed ledger, the asset protocol defining asset attributes and including token status data;

associating, by an application on the administration server, each general asset token with one or more smart contract protocols, the one or more smart contract protocols stored in a distributed ledger, each of the one or more smart contract protocols validating one or more general asset tokens based on the general asset pool, wherein the one or more general asset tokens are associated with a plurality of users of the platform, each of the general asset tokens having a first value, the one or more general asset tokens mapped, by the application, to a value of one or more assets in a general asset pool;

receiving a subscription request from one or more client devices and by the application to use one of the one or more general asset tokens to create one or more specific asset tokens that map to a portion of specific assets from the general asset pool, each of the subscription requests including asset data or data for a user associated with the client device making the request to the administration server, the one or more assets in the general asset pool including the specific assets, wherein each of the one or more client devices is associated with one of the plurality of users associated with the one of the one or more general asset tokens to be used in the creation of specific asset tokens;

creating, by the token manager on the administration server in response to the at least one received subscription request, a first specific asset token that maps to a portion of the value of a specific asset within the general asset pool, the first specific asset token based at least in part on the request data and stored in the distributed ledger;

transferring from the general asset pool the portion of the value of the specific asset that maps to the first specific asset token to a repository within the distributed ledger, the transfer controlled by data within the smart contract or logic associated with the specific asset, and storing a record of the generated specific asset token and the updated status of the general asset token or general asset pool, the record including tasks and data interactions between plurality of users, wherein each of the plurality of users is associated with a remote client device, and the general asset and specific asset tokens stored as data on the distributed ledger.

2. The method of claim 1, further comprising updating a repository in a datastore by the asset pool manager stored in memory on the administration server to include the general asset token.

3. The method of claim 1, further comprising removing the general asset token from the repository in the distributed ledger and associating the general asset token with an updated general asset pool with different member and value attributes, the general asset token having a second value based on the updated value of the prior general asset pool and further augmented by newly added or removed assets.

4. The method of claim 1, further including a second mapping, stored in the distributed ledger, between the first specific asset and a first specific asset token, wherein the first specific asset token maps to a portion of the value of a specific asset that is a portion of the value of the whole specific asset.

5. The method of claim 1, wherein the value of the specific asset token is equivalent to the general asset tokens associated with the specific asset portion and a transaction cost.

6. The method of claim 1, wherein the specific asset and all specific asset tokens mapped to the specific asset are associated with an asset that is a financial asset or a physical asset.

7. The method of claim 1, further comprising storing general asset token information and specific asset token information in the distributed ledger by the application, the distributed ledger maintained by one or more distributed machines.

8. The method of claim 7, further comprising:
receiving a request by the application stored on the administration server to transfer ownership of a specific asset token or general asset token between a client device associated with a first user and a second client device associated with a second user of the plurality of users; and
updating the distributed ledger based on the transfer of ownership of the specific asset token between the first user and the second user.

9. The method of claim 1, further comprising:
receiving an asset recommendation request by the application on the administration server from a client device associated with one of the plurality of users;
processing data associated with the user by a model for generating asset recommendations and supporting information for the recommendation, the model being trained by data; and
providing recommendation data by the application on the administration server to the client device associated with the one of the plurality of users based on an output of the model.

10. The method of claim 1, wherein the datastore is implemented at least in part by a distributed ledger on one or more remote machines with respect to the administration server.

11. The method of claim 1, wherein the datastore is implemented at least in part by a centralized server.

* * * * *